(12) United States Patent
Tsuchiya et al.

(10) Patent No.: US 11,314,816 B2
(45) Date of Patent: Apr. 26, 2022

(54) RESEARCH AND DEVELOPMENT SUPPORT SYSTEM

(71) Applicant: Hitachi, Ltd., Tokyo (JP)

(72) Inventors: Yuko Tsuchiya, Tokyo (JP); Etsuko Nomoto, Tokyo (JP); Satoko Hinomizu, Tokyo (JP); Toru Yasumura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 534 days.

(21) Appl. No.: 16/360,057

(22) Filed: Mar. 21, 2019

(65) Prior Publication Data

US 2020/0097838 A1 Mar. 26, 2020

(30) Foreign Application Priority Data

Sep. 26, 2018 (JP) .............................. JP2018-179934

(51) Int. Cl.
*G06F 16/9038* (2019.01)
*G06F 16/11* (2019.01)
(Continued)

(52) U.S. Cl.
CPC ........ *G06F 16/9038* (2019.01); *G06F 16/125* (2019.01); *G06F 16/1734* (2019.01);
(Continued)

(58) Field of Classification Search
CPC ............... G06F 16/125; G06F 16/9038; G06F 16/9035; G06F 16/1734; G06N 5/022; G06N 5/04
(Continued)

(56) References Cited

U.S. PATENT DOCUMENTS

2005/0259035 A1* 11/2005 Iwaki ..................... G06F 3/011
345/8
2006/0111958 A1 5/2006 Ishimaru et al.
(Continued)

FOREIGN PATENT DOCUMENTS

JP 2004-54592 A 2/2004
JP 2016-31698 A 3/2016

OTHER PUBLICATIONS

Japanese Office Action received in corresponding Japanese Application No. 2018-179934 dated Jul. 6, 2021.

*Primary Examiner* — Mark E Hershley
(74) *Attorney, Agent, or Firm* — Mattingly & Malur, PC

(57) ABSTRACT

A research and development support system includes: one or more databases that store a plurality of types of data and information related to research and development, and an administrative system that accesses the one or more databases to perform information processing. The one or more databases stores research and development-related information as information related to research and development conducted by a researcher, device-related information as information related to devices used for research and development, and usage history information as information on history of the device being used by the researcher. The administrative system is configured to generate and outputting information that supports research and development on the basis of the usage history information, the device-related information, and the research and development-related information.

12 Claims, 35 Drawing Sheets

(51) Int. Cl.
*G06F 16/17* (2019.01)
*G06F 16/9035* (2019.01)
*G06N 5/02* (2006.01)
*G06N 5/04* (2006.01)

(52) U.S. Cl.
CPC ......... *G06F 16/9035* (2019.01); *G06N 5/022* (2013.01); *G06N 5/04* (2013.01)

(58) Field of Classification Search
USPC ........................................................ 707/740
See application file for complete search history.

(56) References Cited

U.S. PATENT DOCUMENTS

| | | | |
|---|---|---|---|
| 2012/0069131 A1* | 3/2012 | Abelow | G06Q 10/067 348/14.01 |
| 2015/0199010 A1* | 7/2015 | Coleman | A61B 5/369 345/156 |
| 2018/0131765 A1* | 5/2018 | Puleston | G06F 16/907 |
| 2019/0113973 A1* | 4/2019 | Coleman | G06F 3/015 |

* cited by examiner

| | |
|---|---|
| DEVICE USAGE DB 125 | DATA ON DEVICE USAGE<br>  DEVICE USAGE RECORDS, DEVICE RESERVATION STATUS, REPAIR TIME INCLUDING MAINTENANCE<br>  SPECIAL CONSIDERATIONS FOR DEVICE USAGE |
| RESEARCHER INFORMATION DB 127 | DATA ON RESEARCHERS<br>  RESEARCHER ID NUMBER, NAME OF RESEARCHER, DEPARTMENT, TITLE, SPECIALTY |
| RESEARCH THEME DB 108 | DATA ON INTERNAL RESEARCH THEMES<br>  RESEARCH NUMBER, NAME OF RESEARCH THEME, RESEARCH PERIOD, BUDGET, NAME OF INVOLVED RESEARCHER, RESEARCHER ID, CURRENT PROGRESS, RESEARCH PLAN (GOAL, ITEMS, MILESTONES),<br>  WEEKLY REPORTS, MEETING MATERIALS |
| INTERNAL PATENT DB 109 | DATA ON PATENTS FILED BY INTERNAL RESEARCHERS<br>  INTERNAL FILING NUMBER, NAME OF PATENT, NAME OF RESEARCHER WHO CREATED INVENTION, RESEARCHER ID, RESEARCH THEME, RESEARCH NUMBER, INTERNAL SUBMISSION DATE, PATENT FILING INFORMATION (FILING NUMBER, FILING DATE, PUBLICATION NUMBER, PUBLICATION DATE, INFORMATION ON APPLICATION FOR EXAMINATION, INFORMATION ON INTERNATIONAL APPLICATION) |
| RESEARCH REPORT DB 110 | DATA ON RESEARCH REPORTS WRITTEN BY INTERNAL RESEARCHERS<br>  REPORT NUMBER, REPORT NAME, NAME OF RESEARCHER WHO SUBMITTED REPORT, RESEARCHER ID, RESEARCH THEME, RESEARCH NUMBER, DATE OF REPORT, SEARCH KEYWORDS (RESEARCH FIELD, PRODUCT APPLICATION FIELD) |
| EXTERNAL PUBLICATION DB 111 | DATA ON PAPERS AND PRESENTATIONS SUBMITTED BY INTERNAL RESEARCHERS TO EXTERNAL ORGANIZATIONS<br>  INTERNAL FILING NUMBER, TITLE OF PUBLICATION, NAME OF SOCIETY FOR PRESENTATION OR NAME OF JOURNAL FOR PAPER SUBMISSION, PUBLICATION DATE, NAME OF RESEARCHER WHO MADE PUBLICATION, RESEARCHER ID, RELEVANT RESEARCH THEME, RESEARCH NUMBER, SEARCH KEYWORDS (RESEARCH FIELD, PRODUCT APPLICATION FIELD) |
| | |

*FIG. 3A*

| | |
|---|---|
| EXPERIMENT INFORMATION DB <br> 113 | RECORDS OF EXPERIMENTS PERFORMED AS PART OF INTERNAL RESEARCH AND DEVELOPMENT <br>   INTERNAL FILING NUMBER, NAME OF RESEARCHER, RESEARCHER ID, RESEARCH THEME, RESEARCH NUMBER, TYPE OF RECORD <br>   - MEMO WITH IDEA FOR RESEARCH <br>   - DATA OBTAINED BY INTERNAL RESEARCHER PERFORMING EXPERIMENT <br>   - DIAGRAM OF ORGANIZED DATA <br>   - MEMO THAT DETAILS A THOUGHT PROCESS <br>   - ELECTRONIC COPY OF HAND-WRITTEN EXPERIMENT NOTES <br>   - LINK TO DATA OF ELECTRONIC EXPERIMENT NOTES OR ELECTRONIC EXPERIMENT NOTE SYSTEM <br>   FILE TYPE, REGISTRATION DATE |
| ASSET DB <br> 116 | DATA ON ASSETS USED FOR RESEARCH AND DEVELOPMENT <br>   ASSET NUMBER, NAME OF ASSET, DEVICE MANAGER, MANAGER ID, INSTALLATION LOCATION, PURCHASE DATE, BOOK VALUE, NAME OF MANUFACTURER, DEVICE SPECIFICATIONS, INFORMATION ON ACCESSORIES, INFORMATION ON DEVICE MODIFICATION, INVENTORY INFORMATION |
| ORDER DB <br> 117 | DATA ON VARIOUS PURCHASE ORDERS TO EXTERNAL COMPANIES <br>   ORDER NUMBER, NAME OF ORDER <br>   CLASSIFICATION <br>     PURCHASE OF NEW DEVICE, DEVICE REPAIR, PURCHASE OF ADDITIONAL PART, PURCHASE OF DEVICE CONSUMABLE, DISPOSAL OF DEVICE, PURCHASE OF CHEMICALS, EXTERNAL ORDER FOR ANALYSIS, PURCHASE OF SOFTWARE FOR RESEARCH <br>   NAME OF ORDERER, ORDERER ID, ORDER-PLACING BUDGET NUMBER, ORDER DATE, DELIVERY DATE, ORDER RECEIVER, PRICE |
| SALES DB <br> 119 | DATA ON SALES OF PRODUCTS <br>   BUSINESS OR PRODUCT NAME <br>   RESEARCH THEME RELATED TO PRODUCT DEVELOPMENT, RESEARCH NUMBER, IMPLEMENTATION PERIOD |

FIG. 3B

| REGISTRATION NUMBER ~1101 | DEVICE ID NUMBER ~501 | RESEARCHER ID NUMBER ~402 | TOTAL USAGE TIME UNIT: HOURS ~1103 | BREAKDOWN (UNIT: HOURS) ~1102 | | | |
|---|---|---|---|---|---|---|---|
| | | | | APRIL, 2018 | MAY, 2018 | JUNE, 2018 | ... |
| 101 | 100100 | 123000 | 50.00 | 10.00 | 5.00 | 10.00 | ... |
| 102 | 100100 | 124000 | 25.25 | 0.00 | 5.00 | 5.00 | ... |
| 103 | 100100 | 125000 | 150.75 | 30.00 | 15.00 | 35.00 | ... |
| 104 | 100100 | 126000 | 10.50 | | | | ... |
| 105 | 200200 | 123000 | 100.00 | | | | ... |
| 106 | 200200 | 127000 | 70.00 | | | | ... |
| ... | ... | ... | ... | ... | ... | ... | ... |

DEVICE USAGE INFORMATION ~1100

*FIG. 11A*

| DEVICE ID NUMBER ~501 | NAME OF DEVICE ~1111 | NAME OF DEVICE MANAGER RESEARCHER ID NUMBER EMAIL ADDRESS ~1112 402 ~1113 | DATE OF DEVICE RESERVATION ~1114 | NAME OF USER WHO MADE RESERVATION RESEARCHER ID NUMBER ~1115 402 | STATUS ~1116 | SPECIAL CONSIDERATIONS ~117 |
|---|---|---|---|---|---|---|
| 100100 | DEVICE B | RESEARCHER B 124000 bbb@abc.co.jp | 4/2 10:00~12:00 | RESEARCHER C 125000 | APPROVED | |
| | | | 4/2 13:00~15:00 | RESEARCHER D 126000 | APPROVED | |
| | | | 4/3 10:00~12:00 | RESEARCHER E 127000 | ON HOLD | PLEASE CONTACT DEVICE MANAGER |
| | | | 4/3 15:00~17:00 | RESEARCHER B 124000 | CANNOT BE USED | PERIODIC MAINTENANCE |
| 200200 | DEVICE C | RESEARCHER C 125000 ccc@abc.co.jp | ... | | ... | ... |
| ... | ... | ... | ... | | ... | ... |

1110

DEVICE RESERVATION STATUS

FIG. 11B

| ASSET NUMBER | NAME OF ASSET | NAME OF ASSET MANAGER RESEARCHER ID NUMBER | INSTALLATION LOCATION | PURCHASE DATE | BOOK PRICE | NAME OF MANUFACTURER | DEVICE SPECIFICATIONS | INFORMATION ON ACCESSORIES INFORMATION ON DEVICE MODIFICATION STOCKTAKING STATUS |
|---|---|---|---|---|---|---|---|---|
| 100100 | DEVICE B | RESEARCHER B 124000 | A BUILDING ROOM 101 | DECEMBER 1, 2008 | OOJPY | OO MACHINES | • FUNCTION 1<br>• FUNCTION 2<br>• MEASUREMENT RANGE A~B | ACCESSORIES: NONE<br>MODIFICATIONS: NONE<br>INVENTORY: IN USE |
| 200200 | DEVICE C | RESEARCHER C 125000 | B BUILDING ROOM 202 | DECEMBER 3, 2008 | OOJPY | XX OPTICS | • FUNCTION 3<br>• FUNCTION 4<br>• MEASUREMENT RANGE C~D | ACCESSORIES: NONE<br>MODIFICATIONS: NONE<br>INVENTORY: IN USE |
| ... | ... | ... | ... | ... | ... | ... | ... | ... |

ASSET INFORMATION

FIG. 12A

| RESEARCHER ID NUMBER (402) | NAME OF RESEARCHER (1251) | DEPARTMENT (1252) | TITLE (1253) | SPECIALTY (1254) |
|---|---|---|---|---|
| 123000 | RESEARCHER A | XX SECTION, XX DEPARTMENT | GENERAL | CRYSTAL GROWTH, CRYSTAL STRUCTURE ANALYSIS |
| 124000 | RESEARCHER B | XX SECTION, XX DEPARTMENT | CHIEF | ELECTRONICS |
| ... | ... | ... | ... | ... |

RESEARCHER INFORMATION (1250)

FIG. 12B

| CLIENT NUMBER | RESEARCH NUMBER | RESEARCH THEME | RESEARCH PERIOD | | BUDGET | NAME OF INVOLVED RESEARCHER | RESEARCHER ID NUMBER | CURRENT PROGRESS |
|---|---|---|---|---|---|---|---|---|
| 6001 | 2018-001 | DEVELOPMENT OF ○○ | APRIL 2018 TO MARCH 2019 | ONE YEAR | 10M¥ | RESEARCHER A | 123000 | 20% |
| | | | | | | RESEARCHER B | 124000 | |
| 7001 | 2018-002 | MODIFICATION OF △△ | APRIL 2018 TO SEPTEMBER 2018 | 6 MONTHS | 5M¥ | RESEARCHER C | 125000 | 20% |
| 8001 | 2018-003 | DEVELOPMENT OF XX | APRIL 2018 TO MARCH 2019 | ONE YEAR | 20M¥ | RESEARCHER D | 126000 | 25% |
| ... | ... | ... | ... | | ... | ... | ... | ... |

INFORMATION ON RESEARCH AND DEVELOPMENT THEMES IN ORGANIZATION

*FIG. 13A*

| RESEARCH NUMBER: 2018-001 | RESEARCH THEME: DEVELOPMENT OF OO | | RESEARCH PERIOD: ONE YEAR APRIL 2018 TO MARCH 2019 | |
|---|---|---|---|---|
| GOAL | 20% IMPROVEMENT IN OO DURABILITY (MARCH 2019) | | | |
| RESEARCH PLAN | APRIL | MAY | JUNE | ... |
| ITEM | EXTRACT CANDIDATE MATERIALS SEARCH FOR EXTERNAL PATENTS | REFINE CANDIDATE MATERIALS REFINE EXTERNAL PATENTS | SYNTHESIZE CANDIDATE MATERIALS CREATE PATENT MAP | ... |
| MILESTONE | | | PROPERTY A: 30% INCREASE | ... |
| WEEKLY REPORT | 4/6 4/13 4/20 4/27 | ... | ... | ... |
| MEETING MATERIALS | 4/23 | ... | ... | ... |

INFORMATION ON RESEARCH AND DEVELOPMENT THEME

FIG. 13B

| INTERNAL FILING NUMBER | NAME OF PATENT | NAME OF RESEARCHER | RESEARCHER ID NUMBER | RESEARCH THEME | RESEARCH NUMBER | INTERNAL SUBMISSION DATE | FILING NUMBER | FILING DATE | ... |
|---|---|---|---|---|---|---|---|---|---|
| 1001 | ○○ MATERIAL | RESEARCHER A | 123000 | DEVELOPMENT OF ○○ | 2018-001 | APRIL 10, 2018 | PATENT APPLICATION NO. 2018-****** | JUNE 10, 2018 | ... |
| 1002 | XX MATERIAL | RESEARCHER C | 125000 | MODIFICATION OF △△ | 2018-002 | MAY 10, 2018 | PATENT APPLICATION NO. 2018-****** | JULY 10, 2018 | ... |
| ... | ... | ... | ... | ... | ... | ... | ... | ... | ... |

INTERNAL PATENTS

*FIG. 14*

RESEARCH REPORTS

| REPORT NUMBER 1501 | NAME OF REPORT 1502 | NAME OF RESEARCHER 1503 | RESEARCHER ID NUMBER 402 | RESEARCH THEME 1303 | RESEARCH NUMBER 1302 | DATE OF REPORT 1504 | SEARCH KEYWORDS 1505 |
|---|---|---|---|---|---|---|---|
| 2001 | IMPROVING XX DURABILITY OF OO MATERIAL | RESEARCHER A | 123000 | DEVELOPMENT OF OO | 2018-001 | MARCH 10, 2019 | POLYMER STRUCTURE ANALYSIS, CONDUCTIVE RESIN |
| 2002 | OO FAILURE ANALYSIS OF △△ DEVICE | RESEARCHER C | 125000 | MODIFICATION OF △△ | 2018-002 | MARCH 11, 2019 | PHOTOSENSITIZER, PHOTO-CURABLE RESIN |
| ... | ... | ... | ... | ... | ... | ... | ... |

*FIG. 15*

| INTERNAL FILING NUMBER | TITLE OF PRESENTATION | NAME OF SOCIETY NAME OF JOURNAL NAME OF PUBLICATION MEDIUM | PUBLICATION DATE | NAME OF RESEARCHER | RESEARCHER ID NUMBER | RESEARCH THEME | RESEARCH NUMBER | SEARCH KEYWORDS |
|---|---|---|---|---|---|---|---|---|
| 3001 | IMPROVING XX DURABILITY OF OO MATERIAL | 10TH CONFERENCE ON OO MATERIAL | OCTOBER 10, 2018 | RESEARCHER A | 123000 | DEVELOPMENT OF OO | 2018-001 | POLYMER STRUCTURE ANALYSIS CONDUCTIVE RESIN |
| 3002 | OO FAILURE ANALYSIS OF △△ DEVICE | JOURNAL OF THE SOCIETY FOR THE STUDY OF △△ DEVICE VOLUME O | OCTOBER 30, 2018 | RESEARCHER C | 125000 | MODIFICATION OF △△ | 2018-002 | PHOTO-SENSITIZER, PHOTO-CURABLE RESIN |
| ... | ... | ... | ... | ... | ... | ... | ... | ... |

EXTERNAL PUBLICATIONS

RESEARCH AND DEVELOPMENT SUPPORT SYSTEM (1800)

SEARCH TERM ENTRY FIELD (1801) | SEARCH (1802)

SEARCH DEVICE USAGE STATUS

JUNE 14, 2018 (THU) 09:55 AM    USER NAME: RESEARCHER B

DEVICE NAME: DEVICE B  ASSET: NUMBER2000-0001
NAME OF DEVICE MANAGER: RESEARCHER B

DEVICES MANAGED BY RESEARCHER B (1803): DEVICE A, DEVICE B, DEVICE C, DEVICE D

DISPLAY UNIT: 6 MONTHS | MONTHS | WEEKS

| | | APRIL | MAY | JUNE | ... |
|---|---|---|---|---|---|
| | RESEARCHER B / RESEARCHER ID NUMBER | PLANNED: 20HOURS PERFORMANCE: 25HOURS | PLANNED: 15HOURS PERFORMANCE: 25HOURS | PLANNED: 5HOURS PERFORMANCE: 8HOURS | ... |
| | RESEARCHER C / RESEARCHER ID NUMBER | PLANNED: 15HOURS PERFORMANCE: 15HOURS | PLANNED: 10HOURS PERFORMANCE: 10HOURS | PLANNED: 5HOURS PERFORMANCE: 2HOURS | ... |
| | RESEARCHER D / RESEARCHER ID NUMBER | PLANNED: 60HOURS PERFORMANCE: 60HOURS | PLANNED: 25HOURS PERFORMANCE: 30HOURS | PLANNED: 40HOURS PERFORMANCE: 20HOURS | ... |
| | ... | | | | |
| | MONTHLY PERFORMANCE TOTAL | 120HOURS / 120HOURS | 80HOURS / 100HOURS | 35HOURS / 135HOURS | |
| MAINTENANCE (1808) | PERIODIC | 2HOURS | 2HOURS | 2HOURS | |
| | REPAIR | | REPAIR BY COMPANY 6HOURS | | |
| | TOTAL MAINTENANCE TIME | 2HOURS | 8HOURS | 2HOURS | |

(1804, 1805, 402, 1806, 1807)

LINKS (1810)
- DEVICE USAGE DB
- ORDER DB
- ASSET DB

COMMENTS/RECOMMENDATIONS (1811)
OVERHAUL BY A COMPANY IS RECOMMENDED WHEN TOTAL OPERATING TIME REACHES 300 HOURS

DETAILS OF REPAIR COMPANY (1809)
ITEM: OVERHAUL
- DISASSEMBLE DEVICE
- CLEAN PARTS
- REPLACE CONSUMABLES
RESPONSIBLE COMPANY: OO ELECTRONIC SERVICES
ORDER NUMBER: 0101-1122
COST: ¥150,000

| 1901 | 1902 | 1903 | 1904 / 402 | 1905 | 1906 / 1907 | 1908 | 1909 | 1910 |
|---|---|---|---|---|---|---|---|---|
| ORDER NUMBER | NAME OF ORDER | TYPE | NAME OF ORDERER / RESEARCHER ID NUMBER | ORDER-PLACING BUDGET NUMBER | ORDER DATE / DELIVERY DATE | ORDER RECEIVER | PRICE | SPECIAL CONSIDERATIONS |
| 6001 | OVERHAUL OF DEVICE B | EXTERNAL ORDER: DEVICE REPAIR | RESEARCHER B 124000 | 7001 | 20180415 20180420 | ○○ CORPORATION | ○○ JPY | ASSET NUMBER OF DEVICE B |
| 6002 | COMPOSITION ANALYSIS OF POLYMER COMPOUND | EXTERNAL ORDER: EXTERNAL ANALYSIS | RESEARCHER C 125000 | 7002 | 20180415 20180420 | △△ ANALYSIS SERVICE | ○○ JPY | |
| ... | ... | ... | ... | ... | ... | ... | ... | ... |

ORDER INFORMATION

*FIG. 19*

| 2100 | 2101 | 2102 |
|---|---|---|
| RESEARCH AND DEVELOPMENT SUPPORT SYSTEM | RESEARCHER B PROGRESS | SEARCH |

RESEARCH AND DEVELOPMENT PROGRESS SEARCH

JUNE 14, 2018 (THU) 09:55 AM   USER NAME: RESEARCHER X

○○ DEPARTMENT   THEME NAME: DEVELOPMENT OF ○○ (2104)   RESEARCH NUMBER: 2018-001 (2105)
○○ SECTION   NAME: RESEARCHER B   ID: 124000
            RESEARCHER ID: 124000

2103 RESEARCH THEME
- RESEARCH ON XX
- DEVELOPMENT OF ○○

2107 INVOLVED PERSONS
- RESEARCHER A
- RESEARCHER B
- RESEARCHER C
- RESEARCHER D

| | 2106 | APRIL | MAY | JUNE | ... |
|---|---|---|---|---|---|
| RESEARCH PLAN | CONTENT | EXTRACT CANDIDATE MATERIALS SEARCH FOR EXTERNAL PATENTS | REFINE CANDIDATE MATERIALS REFINE EXTERNAL PATENTS | SYNTHESIZE CANDIDATE MATERIALS CREATE PATENT MAP | |
| | MILESTONE | | | PROPERTY A: 30% INCREASE | |
| DEVICE USAGE STATUS | DEVICE B | PLANNED: 20HOURS PERFORMANCE: 25HOURS | PLANNED: 15HOURS PERFORMANCE: 25HOURS | PLANNED: 5HOURS PERFORMANCE: 15HOURS | |
| | DEVICE X | PLANNED: 0HOURS PERFORMANCE: 0HOURS | PLANNED: 5HOURS PERFORMANCE: 6HOURS | PLANNED: 10HOURS PERFORMANCE: 5HOURS | |
| | DEVICE Y | PLANNED: 0HOURS PERFORMANCE: 0HOURS | PLANNED: 0HOURS PERFORMANCE: 0HOURS | PLANNED: 15HOURS PERFORMANCE: 0HOURS | |

2108 / 2109 LINKS
- WEEKLY REPORTS
- PROGRESS MEETING MATERIALS
- RESEARCH REPORTS
- PATENT SPECIFICATIONS
- EXTERNAL PUBLICATIONS
- EXPERIMENT DATA
- DATA ANALYSIS SYSTEM
- EXTERNAL RESEARCH-RELATED DB
...

2110 COMMENTS/RECOMMENDATIONS
RESEARCHER B MAY BE BEHIND SCHEDULE
REASON: PLANS ARE FOR RESEARCHER B TO USE DEVICE Y IN JUNE, BUT RESEARCHER B HAS NOT STARTED USING IT.

FIG. 21

| | | APRIL | MAY | JUNE |
|---|---|---|---|---|
| RESEARCH PLAN | CONTENT | EXTRACT CANDIDATE MATERIALS SEARCH FOR EXTERNAL PATENTS | REFINE CANDIDATE MATERIALS REFINE EXTERNAL PATENTS | SYNTHESIZE CANDIDATE MATERIALS CREATE PATENT MAP |
| RESEARCH PLAN | MILESTONE | | | PROPERTY A: 30% INCREASE |
| DEVICE USAGE STATUS | DEVICE B | PLANNED: 20HOURS PERFORMANCE: 25HOURS | PLANNED: 15HOURS PERFORMANCE: 25HOURS | PLANNED: 5HOURS PERFORMANCE: 15HOURS |
| DEVICE USAGE STATUS | DEVICE X | PLANNED: 0HOURS PERFORMANCE: 0HOURS | PLANNED: 5HOURS PERFORMANCE: 6HOURS | PLANNED: 10HOURS PERFORMANCE: 5HOURS |
| DEVICE USAGE STATUS | DEVICE Y | PLANNED: 0HOURS PERFORMANCE: 0HOURS | PLANNED: 0HOURS PERFORMANCE: 0HOURS | PLANNED: 15HOURS PERFORMANCE: 0HOURS |

FIG. 24A

| 2501 | 2502 | 402 | 1303 | 1302 | 2503 | 2504 | 2505 |
|---|---|---|---|---|---|---|---|
| INTERNAL FILING NUMBER | NAME OF RESEARCHER | RESEARCHER ID NUMBER | RESEARCH THEME | RESEARCH NUMBER | TYPE | FILE TYPE | REGISTRATION DATE |
| 4001 | RESEARCHER A | 123000 | DEVELOPMENT OF ○○ | 2018-001 | EXPERIMENT NOTES | PDF | APRIL 10, 2018 |
| 4002 | RESEARCHER A | 123000 | DEVELOPMENT OF ○○ | 2018-001 | EXPERIMENT DATA | EXCEL | APRIL 11, 2018 |
| 4003 | RESEARCHER A | 123000 | DEVELOPMENT OF ○○ | 2018-001 | GRAPH/DIAGRAM | POWERPOINT | APRIL 11, 2018 |
| 4003 | RESEARCHER A | 123000 | DEVELOPMENT OF ○○ | 2018-001 | MEMO ON THOUGHTS | PDF | APRIL 11, 2018 |
| 4002 | RESEARCHER C | 125000 | MODIFICATION OF △△ | 2018-002 | EXPERIMENT NOTES | PDF | MARCH 11, 2019 |
| ... | ... | ... | ... | ... | ... | ... | ... |

2500 EXPERIMENT INFORMATION

FIG. 25

| CLIENT NUMBER | BUSINESS NAME/ PRODUCT NAME | SALES (¥) | | | RESEARCH NUMBER | NAME OF RESEARCH AND DEVELOPMENT THEME | IMPLEMENTATION PERIOD | PERIOD (YEARS) |
|---|---|---|---|---|---|---|---|---|
| | | FISCAL YEAR 2020 | FISCAL YEAR 2021 | FISCAL YEAR 2022 | | | | |
| 6001 | BUSINESS A | 10,000,000 | 12,000,000 | 12,000,000 | 2018-001 | DEVELOPMENT OF ○○ | 2018~2020 | 1 |
| 7001 | BUSINESS B | 20,000,000 | 20,000,000 | 22,000,000 | 2018-002 | MODIFICATION OF △△ | 2018~2020 | 2 |
| 8001 | BUSINESS C | 30,000,000 | 25,000,000 | 25,000,000 | 2018-003 | DEVELOPMENT OF ×× | 2018~2019 | 1 |
| ... | ... | ... | ... | ... | ... | ... | | |

INFORMATION RELATED TO SALES

*FIG. 30*

RESEARCH AND DEVELOPMENT SUPPORT SYSTEM

CLAIM OF PRIORITY

The present application claims priority from Japanese patent application JP 2018-179934 filed on Sep. 26, 2018, the content of which is hereby incorporated by reference into this application.

BACKGROUND

The present invention relates to a research and development support system that improves the efficiency of research and development.

Over the past few years, companies have been actively implementing information technology (IT) in order to improve productivity. In manufacturing departments, various data on issues related to manufacturing processes such as materials, manufacturing devices, manufacturing process conditions, and how workers work is sensed and stored as digital information. The stored data is then analyzed and aspects that can be improved are extracted and reflected in the manufacturing process. As a result, work is made more efficient. One example of a technology that senses how workers work is disclosed in JP 2005-332309 A.

One characteristic example of IT being implemented at a research and development department of a company involves electronic experiment notes (digital experiment notes) being adopted in the research and development department of chemical manufacturers or parts manufacturers that deal with a large variety of materials. Experiment data as a research and development asset of the company can be simply electronized and, as described in WO 2016/208623 A1, relevant types of experiment data can be associated with electronized each other to trace the flow of experiments and the source of the experiment data. In addition, deliverables such as experiment data, research reports, papers, and patents obtained through conducting research and development are put into databases and managed in companies.

Researchers and technicians at companies usually conduct research and development work including experiments, analyzing data, and creating reports while also performing tasks not related to research and development, such as selecting and purchasing parts and devices required for experiments, performing maintenance on devices, managing the progress of research groups, and coordinating with related departments. IT applications are also being used to manage such tasks that are outside of the scope of research and development. For example, databases and dedicated application software that are installed in companies are being used to assist with work associated with research and development, such as purchasing and managing research and development assets such as experiment devices.

SUMMARY

However, conventional IT systems are only able to improve the efficiency of certain tasks and not actual research and development. Therefore, there is a need for a research and development support system that effectively utilizes data and information associated with research and development to improve the efficiency of research and development.

An aspect of the present invention is A research and development support system including: one or more databases that store a plurality of types of data and information related to research and development; and an administrative system that accesses the one or more databases to perform information processing. The one or more databases stores research and development-related information as information related to research and development conducted by a researcher, device-related information as information related to devices used for research and development, and usage history information as information on history of the device being used by the researcher. The administrative system is configured to generate and outputting information that supports research and development on the basis of the usage history information, the device-related information, and the research and development-related information.

According to a representative example of the present invention, research and development can be made more efficient through effectively using data and information associated with research and development.

BRIEF DESCRIPTION OF THE DRAWINGS

FIGS. 3A and 3B illustrate a diagram for illustrating the content of data and information.

FIG. 11A is a diagram for illustrating an exemplary device usage information that is stored in the device usage database in the research and development support system.

FIG. 11B is a diagram for illustrating an exemplary information on device reservation status that is stored in the device usage database.

FIG. 12A is a diagram for illustrating an example of device asset information that is stored in the asset database in the research and development support system.

FIG. 12B is a diagram for illustrating an example of researcher information that is stored in the researcher information database in the research and development support system.

FIG. 13A is a diagram for illustrating an example of information related to research and development themes in the organization that is stored in the research theme database in the research and development support system.

FIG. 13B is a diagram for illustrating an example of information related to a research plan for any research and development theme that is stored in the research theme database in the research and development support system.

FIG. 14 is a table of information on internal patents.

FIG. 15 is a table of information on research reports.

FIG. 16 is a table of information on external publications.

FIG. 18 is a diagram for illustrating an exemplary screen that is used to search for device usage status and is displayed as a user interface screen to the person conducting the search.

FIG. 19 is a diagram for illustrating an example of information related to ordering that is stored in the order database.

FIG. 21 is a diagram for illustrating an exemplary screen for searching for progress of research and development and is displayed as a user interface screen to the person conducting the search.

FIGS. 24A and 24B illustrates a diagram for illustrating an exemplary experiment information management screen that is used by a researcher to manage and search for experiment information.

FIG. 25 is a diagram for illustrating exemplary experiment information that is stored in the experiment information database.

FIG. 30 illustrates a table of the data stored in the sales database.

DESCRIPTION OF THE EMBODIMENTS

Figure 1:
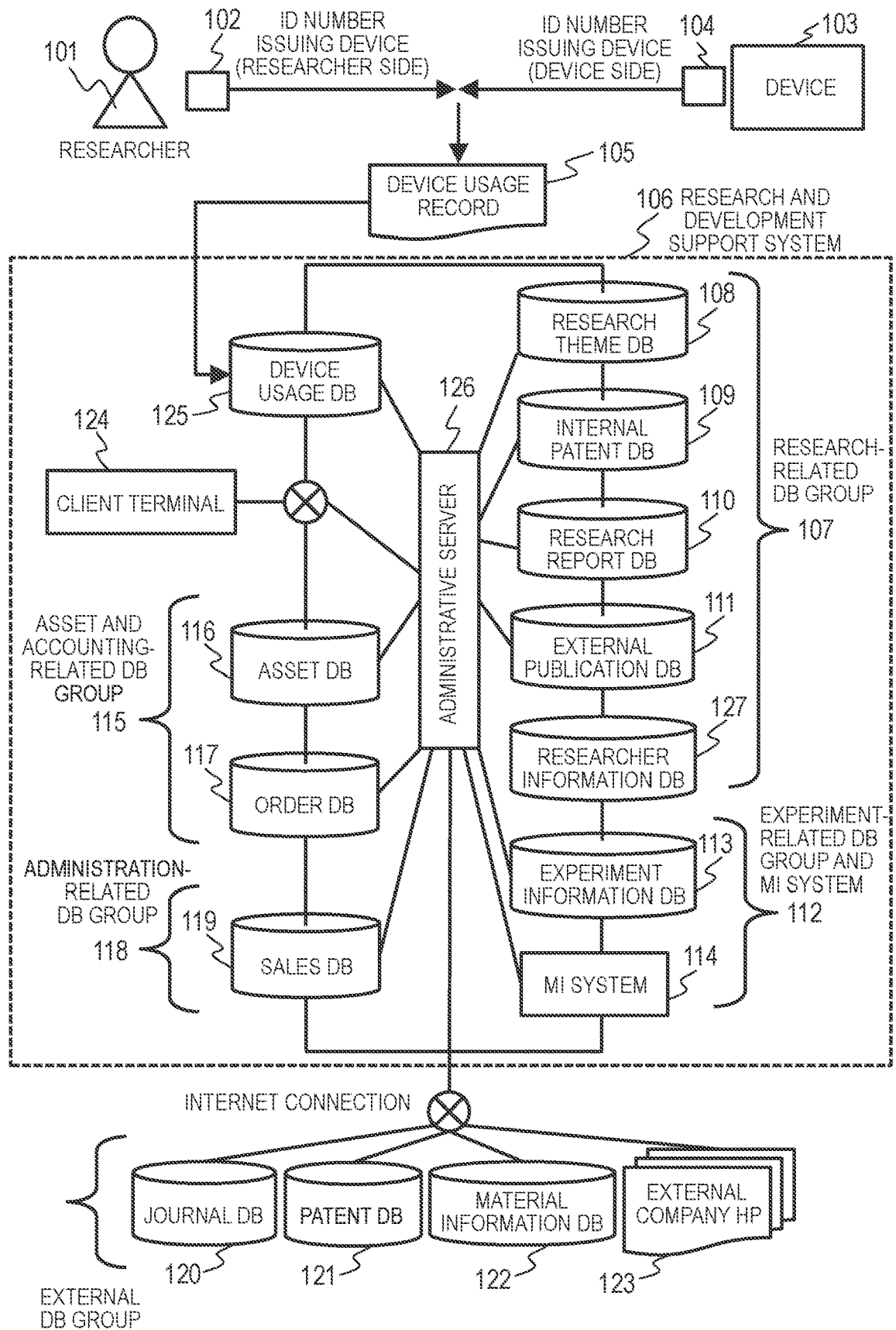
FIG. 1 is an overall configuration diagram of the research and development support system according to this Example.

Examples of the present invention are described below with reference to the figures. The examples of the present invention relate to a research and development support system and application software that improve the efficiency of research and development by collecting data and information associated with research and development and effectively utilizing the information through association and analysis and the like.

In research and development work, the same experiment may be performed every day, but a different device and/or laboratory is usually used every day. Human movement differs from routine work such as that employed in manufacturing departments. Therefore, it is difficult to make research and development more efficient when using sensing technology to acquire and analyze work data.

In research and development departments where a new task is likely to be performed every day, acquiring and analyzing data on which devices are used by people and how those devices are used is thought to lead to making research and development more efficient. However, this is not currently the case. Usage information on when a particular device is used, who used the device, and how the device was used is often recorded by hand in the form of paper notes and is not yet electronized or stored in databases.

Some companies use scheduling software with a scheduling function to reserve the use of experiment devices, but the reservation data generated in this case is not collated with data on actual device usage or being stored in databases. Therefore, in research and development departments, while the manager of the experiment device will be known, records such as those on the name of the person actually using the device, the usage time of the device and the experiments conducted with the device are not electronized, stored in databases or searched. In other words, this information is not being utilized.

Associating a plurality of pieces of experiment data with each other allows experiment data to be organized and interpreted, which is expected to improve efficiency. However, it is difficult to verify whether efficiency is improved in terms of whether experiments themselves are being effectively conducted according to research plans. It is often the case that databases owned by research and development departments in companies are only configured as dedicated application software used for particular tasks and cannot be linked with application software and databases for other applications. Therefore, a plurality of internal databases need to be individually checked to find the information necessary to verify what kind of research results (patent applications, publications to academic societies, products, etc.) have been obtained from one series of experiments. Therefore, work is hardly efficient.

While operating conditions for devices are usually constant in manufacturing departments, in research and development departments, experiment data is obtained by varying the operating conditions for experiment devices. Therefore, it is important to reference know-how on using experiment devices and data on past usage achievements in order to effectively conduct research and development.

For example, young researchers have less experience and knowledge than senior researchers and may need to gain insight from senior researchers when using a device they have not used before. In this case, data including fields of specialization of researchers, research results, devices with which results have been achieved, and know-how on device usage needs to be associated with each other. Otherwise, it takes a long time to individually search through a plurality of internal databases to find a suitable researcher. This expended time leads to delay in research and development.

Sometimes, researchers can obtain information on how to solve research problems from research results and information on experiment devices that were used by researchers in similar fields or fields that may not seem similar. However, it is difficult to obtain new ideas and hints for solving problems if the data and information stored in a plurality of different databases are not associated with each other.

Research and development starts from an idea for research and includes a series of tasks such as creating a research plan, performing experiments, organizing and analyzing data, creating internal achievement reports, applying for patents, submitting papers, presenting topics at conferences, and thinking of the next idea for research. Research and development also involves purchasing parts and consumables associated with research and development, and managing experiment devices, including managing device maintenance. Currently, information associated with research and development (including experiment data) is dispersed across a plurality of dedicated databases designed for particular purposes and is not associated with each other.

Local optimization or improvement in efficiency is insufficient for improving the overall efficiency of research and development, which involves not only implementing planned experimentation but also effectively using research and development assets and creating new ideas. There is a need for a system that can oversee all research and development work and correlate and display necessary data and information. More specifically, there is a need for a system that can automatically correlate items that are highly relevant to each other and present those items in a searchable form, or a system that recommends items related to a search on the basis of the person conducting the search or the characteristics and trends of the items being searched.

There is described below a research and development support system that improves the efficiency of research and development through effectively collating data and information associated with research and development, including the usage status of experiment devices, and effectively utilizing that data and information through association and analysis. The research and development support system described below is able to generate and display information that supports research and development by using searches to associate information generated by conducting research and development, to thereby improve the efficiency of research and development.

Example 1

In the system described below, each researcher that conducts research and development is assigned a unique researcher identifier (researcher ID) that can distinguish that researcher from other researchers. One example of a researcher identifier is a researcher ID number which may be, for example, the same as an employee number in a company. The researcher may also use another identifier that distinguishes that researcher from other researchers.

Devices used by researchers for experiments are also assigned unique device identifiers (device IDs) that can distinguish those devices from other devices. The device identifier may be an asset registration number that is used when managing assets owned by a company. Alternatively, other identifiers that can distinguish devices from each other may be used.

A device usage record is a record of when a researcher has used a device and refers to a set of data that includes researcher IDs, device IDs, time at which a person started using a device (usage start time) and time at which a person stopped using a device (usage end time). The device usage record is acquired and recovered using an appropriate method (to be described later). The device usage record is stored in a device usage database.

FIG. 1 is an overall configuration diagram of the research and development support system according to this Example. A researcher 101 who uses a device wears a researcher ID number issuing device 102 as a sensor terminal. A device 103 that is used by a researcher is provided with a device ID number issuing device 104 as a sensor terminal.

Figures 7, 8:
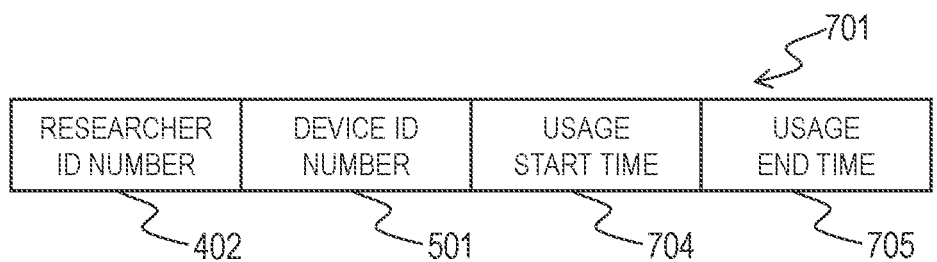
FIG. 7 illustrates the device usage record for one usage.
FIG. 8 is a table for showing an example of a device usage record over a plurality of uses stored in the memory of the sensor terminal of the researcher.

When the researcher faces the device and begins an experiment, a usage start time 704 is recorded. When the experiment has finished and the researcher moves away from the device, a usage end time 705 is recorded. As illustrated in FIG. 7, one device usage record 105 is a set of data that includes a researcher ID number 402, a device ID number 501, a usage start time 704 and a usage end time 705. The device usage record 105 is stored in a device usage database 125.

The device usage database 125 is a component of the research and development support system 106 and is connected to an administrative server 126. The research and development support system 106 also includes a researcher information database 127, a research theme database 108, an internal patent database 109, a research report database 110, and an external publication database 111 as a research-related database group 107. These databases are connected to the administrative server 126. The types of databases and number of databases may be changed through system settings. Further, the data structure of the information stored in one or more databases can be changed by design.

The research and development support system 106 further includes an experiment-related database group 112 including an experiment information database 113 and a materials informatics system (MI system) 114 if conducting research and development in a materials field. These databases are connected to the administrative server 126. The research and development support system 106 also includes an asset database 116 and an order database 117 as an asset and administration-related database group 115. These databases are connected to the administrative server 126. The research and development support system 106 further includes a sales database 119 as an accounting-related database group 118. This database is connected to the administrative server 126.

The research and development support system 106 may also include databases other than those described above. For example, the research and development support system 106 may include databases related to health and safety for research and development on material science and material engineering. The above-described database groups may be used in place of components that are conventionally included in systems other than the research and development support system. For example, the asset database 116 may be used in place of an asset database included in a conventional asset management system that manages research and development assets such as experiment devices in an organization. The order database 117 may be used in place of an order database included in an order management system that is conventionally used for purchasing components from other companies.

The database groups that make up the research and development support system are database groups that belong to an organization (for example, a company). The research and development support system may connect to the Internet to connect to additional database groups other those described above, such as a database 120 for journals related to research and development, a patent database 121 for national and foreign patents, a database 122 related to material information if conducting research and development in a materials field, or links 123 to the websites of other related organizations. These databases and the link represent databases of other organizations.

The research and development support system 106 may include a client terminal 124 such as a personal computer (PC) or a tablet terminal as input/output means. The client terminal 124 can communicate with the administrative server 126 via a network.

The client terminal 124 includes a processor, a storage device that stores programs executed by the processor and data for the programs, and an interface that connects to a network. The programs and the storage device do not need to be included in the client terminal 124 and may be provided at another location through communication via a network. The client terminal 124 may include, for example, a mouse and keyboard and/or a touch-panel as input devices, and a display device and/or a printer as output devices.

Figure 2:
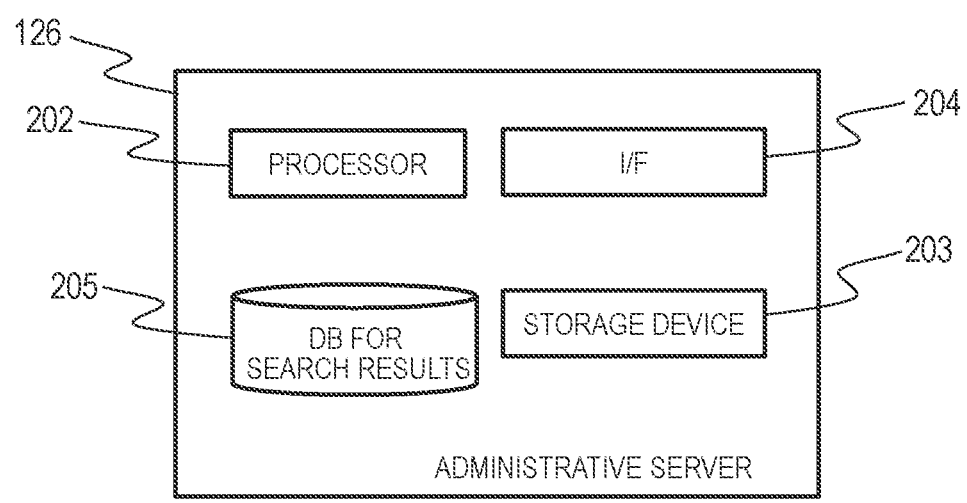
FIG. 2 is a configuration diagram for illustrating the system of the administrative server.

The research and development support system 106 includes the administrative server 126 for managing the above-described database groups. FIG. 2 is a configuration diagram for illustrating the system of the administrative server 126. The administrative server 126 includes a processor 202 that performs calculation and control, a storage device 203, and a network interface (I/F) 204. These components can communicate with each other via buses. Any number of these components may be provided. The administrative server 126 may further include a dedicated database for search results 205 that is used when giving recommendations.

The storage device 203 includes a storage medium that stores programs executed by the processor 202 and data used by the programs. The programs include an operating system and application programs. The processor 202 executes various types of processing according to the programs stored in the storage device 203. Various functional units are realized through the processor 202 operating according to the programs.

The administrative server 126 connects to a network using the I/F 204. The administrative server 126 may further include an input/output interface and an input/output device. The functions implemented by the administrative server 126 may be distributed and processed by a plurality of computers.

FIGS. 3A and 3B illustrate a diagram for illustrating the content of data and information that is stored in each of the databases 108 to 111, 113, 116, 117, 119, 125 and 127 in the database groups in the research and development support system 106. The database groups may also store information that is not illustrated in FIGS. 3A and 3B.

Figure 4:
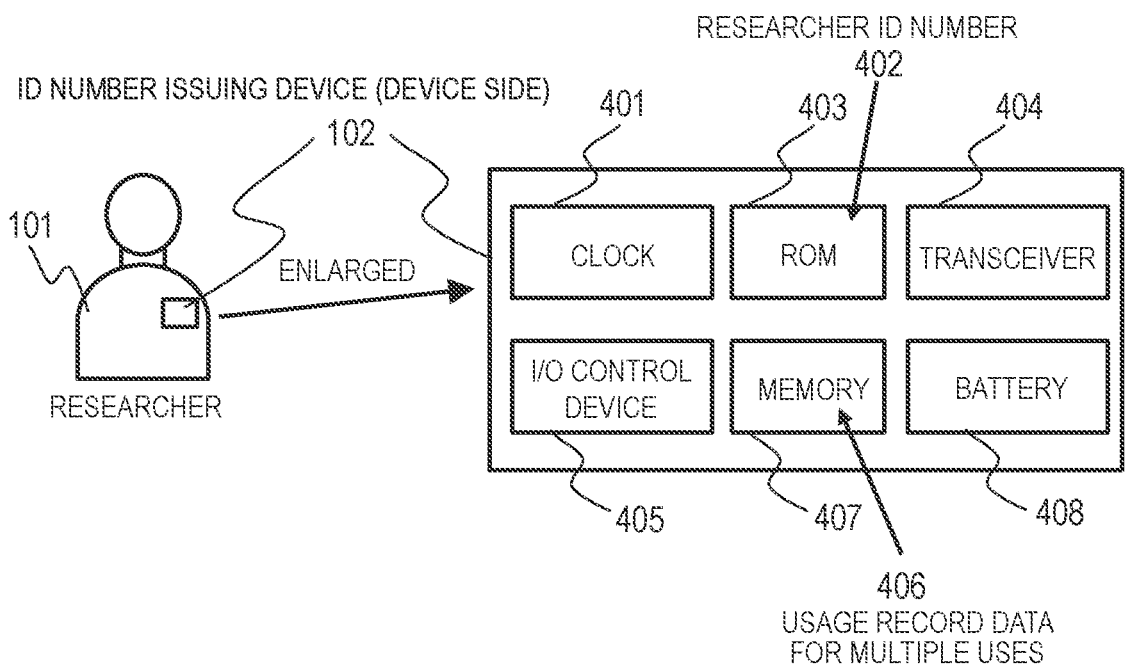
FIG. 4 is a diagram for illustrating the researcher ID number issuing device that is the sensor terminal of the researcher side.

FIG. 4 is a diagram for illustrating the researcher ID number issuing device 102 that is the sensor terminal of the researcher side. As shown in FIG. 4, the researcher wears the researcher ID number issuing device 102 as a sensor terminal. The researcher may wear the researcher ID number issuing device 102 as a name tag that is sewn onto clothes, a removable badge, or an ID card that is worn around the neck. Further, the researcher ID number issuing device 102 may be a pair of glasses or a wristband. Any commercially available wristwatch, mobile phone or smart phone has the sensors and functions required of the present embodiment may be used as the sensor terminal.

The researcher ID number issuing device 102 includes a clock 401 that is used to check the time when recording time and a ROM 403 that stores the researcher ID numbers 402 that identify individual researchers. The researcher ID number issuing device 102 further includes a transceiver 404 that is used when sending/receiving data to/from another device, an I/O control device 405, a memory 407 that stores device usage records over a plurality of times 406, and a battery 408. If the researcher ID number issuing device 102 is a non-contact sensor terminal (to be described later), the researcher ID number issuing device 102 preferably includes an infrared sensor or an infrared beacon in addition to the transceiver 404. Frequencies other than infrared may also be used.

The memory that is used to store usage record data does not need to be included in the researcher ID number issuing device 102 and may be included in the device ID number issuing device 104 to be described later. A memory written with device usage record data may be provided to one or both of the two types of ID number issuing devices (sensor terminals). The clock may also be included in one or both of the two types of ID number issuing devices. A clock is preferably included in any ID number issuing device that has a memory.

Figure 5:
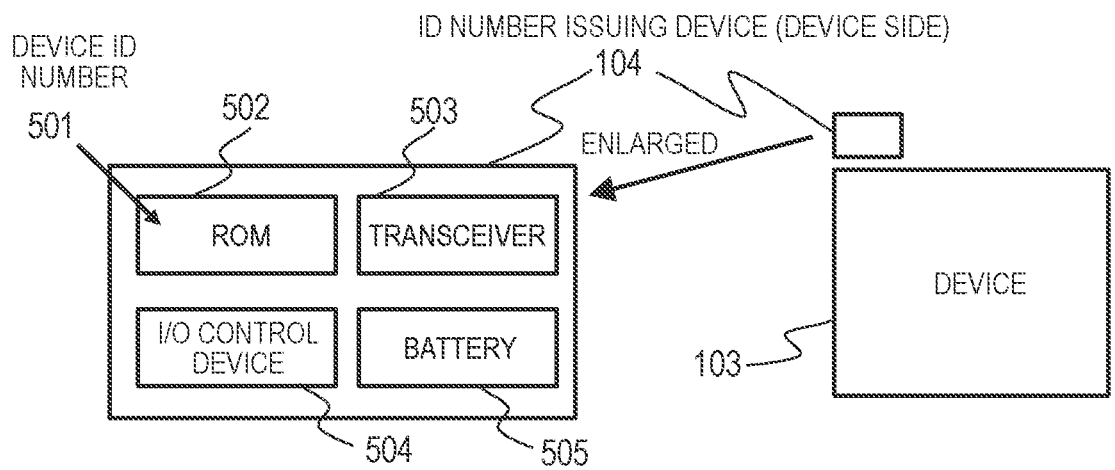
FIG. 5 is a diagram for illustrating the device ID number issuing device that is a sensor terminal of the device side.

FIG. 5 is a diagram for illustrating the device ID number issuing device 104 that is a sensor terminal of the device side. The device ID number issuing device 104 is fixed to a device that is to be used by a researcher for conducting experiments. The device ID number issuing device 104 includes a ROM 502 that stores the device ID number 501, a transceiver 503 that is used when sending/receiving data to/from other devices, an I/O control device 504, and a battery 505. If the device ID number issuing device 104 is a non-contact sensor terminal (to be described later), the device ID number issuing device 104 preferably includes an infrared sensor or an infrared beacon in addition to the transceiver 503. Frequencies other than infrared may also be used.

Device usage records may be created and acquired using either a contact method or a non-contact method. With a contact method, data that constitutes the usage record is generated and acquired by causing the two sensor terminals on the researcher side and the device side to make contact with each other. With a non-contact method, data that constitutes the usage record is generated and acquired through infrared communication or wireless communication using frequencies other than infrared, and the two sensor terminals do not make contact with each other.

If using a contact method, the device ID number issuing device 104 is preferably disposed to be exposed to the front surface, side surface or top surface of the device to be used for experiments so that the two sensor terminals can easily make contact with each other. Even when using a non-contact method, the device ID number issuing device 104 is preferably disposed to be exposed to the front surface, side surface or top surface of the experiment device so that the two sensor terminals can easily send/receive data through infrared communication or wireless communication. However, the device ID number issuing device 104 may also be disposed on the back surface of the experiment device provided that communication is not interrupted.

When using a contact method, the researcher must cause the sensor terminal 102 to make contact with the sensor terminal 104 of the device side both when the experiment starts and when the experiment ends in order to accurately generate and acquire device usage records. Therefore, if the researcher temporarily moves away from the experiment device during an experiment, the researcher must cause the sensor terminals 102 and 104 to make contact with each other each time the researcher moves away in order to obtain accurate data. It is also to be expected that the researcher forgets to cause the sensor terminals 102 and 104 to make contact with each other at the start of an experiment or at the end of an experiment.

Therefore, if using a contact method, a system is preferably put in place that makes a sound to urge the researcher to cause the sensor terminals 102 and 104 to make contact, or that prevents the experiment device from turning on if the sensor terminals 102 and 104 have not made contact. Other systems that prevent the researcher from forgetting to cause the sensor terminals 102 and 104 to make contact with each other may also be implemented.

Figure 6:
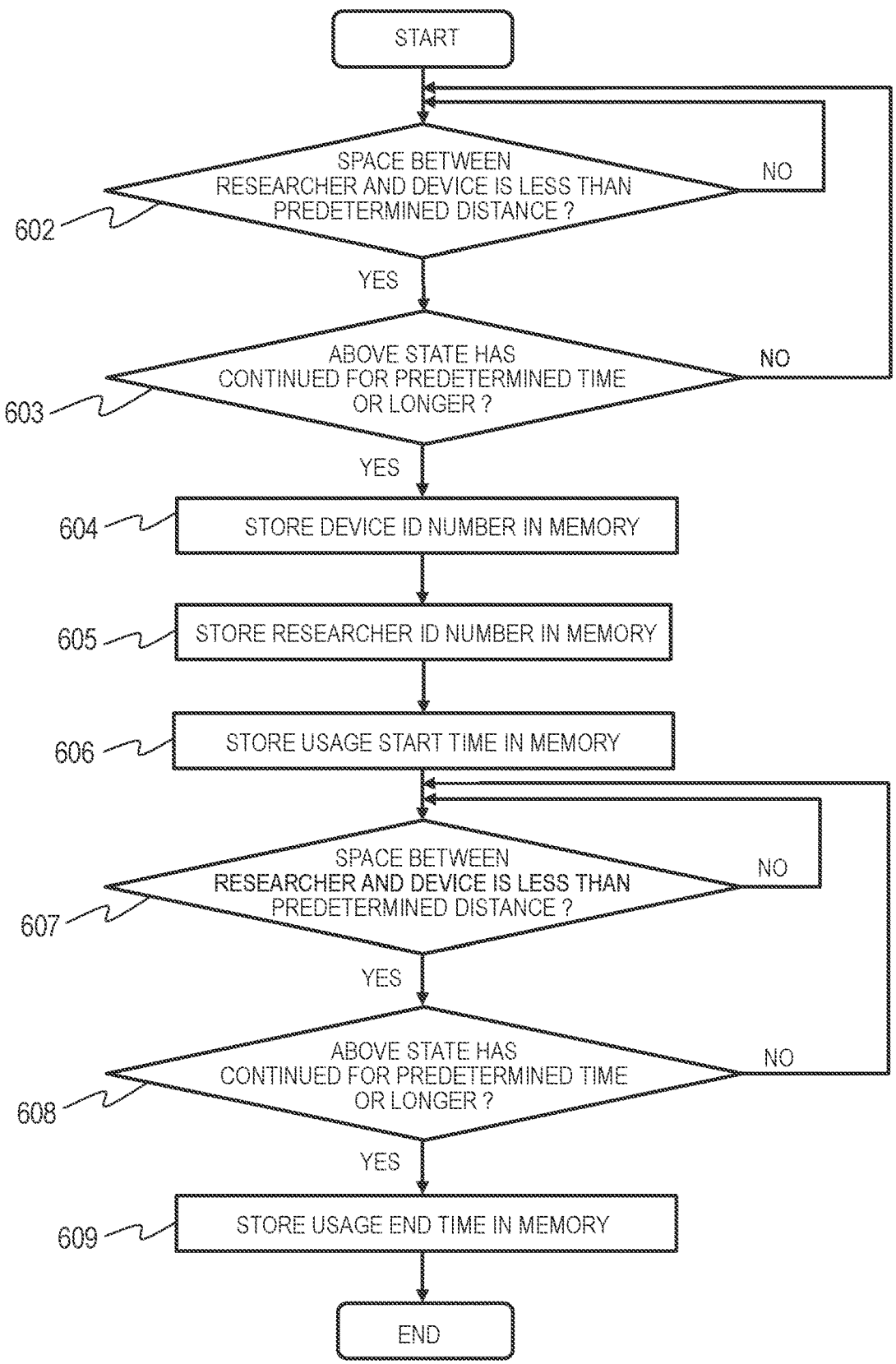
FIG. 6 illustrates an information processing flow for generating a device usage record using a non-contact method.

If using a non-contact method, errors related to generating usage records that occur due to the researcher forgetting to cause the researcher side and device side sensor terminals 102 and 104 to make contact with each other are less likely. FIG. 6 illustrates an information processing flow for generating a device usage record using a non-contact method. The fixed sensor terminal 104 on the device transmits infrared beacons at constant intervals. These infrared beacons include information on the device ID number 501. The sensor terminal 102 of the researcher receives the beacons using an infrared sensor.

The sensor terminal 102 of the researcher side repeatedly performs determination as to whether the researcher is less than a predetermined distance away from the device (602) and whether that state has continued for a predetermined period of time (603). The sensor terminal 102 of the researcher determines the distance between the researcher and the experiment device on the basis of the output intensity of the beacon received from the sensor terminal 104 on the device. If the output intensity of the beacon is higher than a threshold value, it is determined that the researcher is less than a predetermined distance from the experiment device.

If the sensor terminal 102 of the researcher side determines that the researcher is less than a predetermined distance from the experiment device (602: YES), and that state has continued for a predetermined period of time (603: YES), the sensor terminal 102 of the researcher side stores the device ID number of the sensor terminal 104 of the device in the memory 407 (604). At this time, the sensor terminal 102 of the researcher also stores the researcher ID number 402 stored in the ROM 403 in the terminal (605). The sensor terminal 102 of the researcher side uses the time at which the device ID number 501 was recorded to generate the usage start time 704 and stores the usage start time 704 in the memory 407 of the sensor terminal (606).

If the sensor terminal 102 of the researcher side determines that the researcher is more than a predetermined distance from the experiment device (607: YES), and that state has continued for a predetermined period of time (608: YES), the sensor terminal 102 of the researcher uses the time at which the predetermined time was reached to generate the usage end time 705 and stores the usage end time 705 in the memory 407 of the sensor terminal (609).

FIG. 7 illustrates the device usage record 105 for one usage. The device usage record 105 for one usage is a set of data 701 that includes the researcher ID number 402, the device ID number 501, the usage start time 704, and the usage end time 705. Methods other than those described above may be used for acquiring the device ID number, the usage start time, and the usage end time with a non-contact method.

Using the above-described non-contact method, data on device usage records across a plurality of uses is written to the memory 407 in the sensor terminal 102 of the researcher side. FIG. 8 is a table for showing an example of a device usage record over a plurality of uses 800 stored in the memory 407 of the sensor terminal 102 of the researcher. In the device usage record 800, one record number 801 is assigned to a device usage record for each use.

Figure 9:
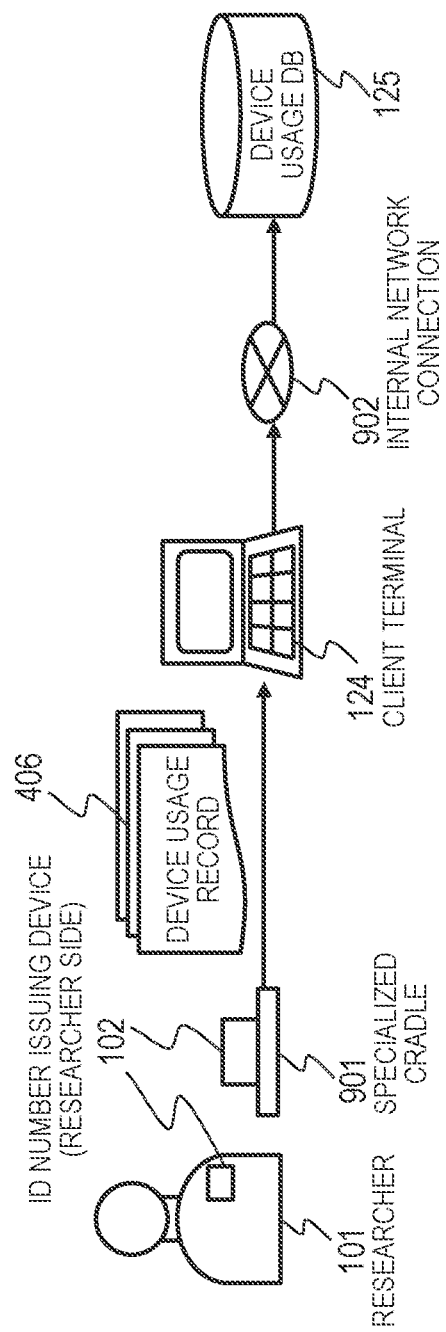
FIG. 9 illustrates an example of a recovery method.

Next, a method of recovering the device usage records over a plurality of uses that are stored in the memory 407 of the sensor terminal 102 of the researcher side is described. FIG. 9 illustrates an example of a recovery method. The sensor terminal 102 of the researcher side periodically makes contact with a dedicated cradle 901 or another component to transfer the device usage records 406 from the memory 407 in the sensor terminal 102 to the device usage database 125 via the client terminal 124 and an internal network connection 902.

The sensor terminal 102 of the researcher side preferably makes contact with the dedicated cradle once per day. For example, the device usage records may be recovered from the sensor terminal 102 of the researcher side when work for the day has ended and the researcher leaves the workplace. Alternatively, the sensor terminal 102 of the researcher may make contact with the dedicated cradle once per week. However, a shorter period is recommended as recovering device usage records after longer periods makes it more difficult to use the data afterward.

Even if the device usage records are stored in a memory (not shown) included in the sensor terminal 104 of the device side and not that of the researcher, the same method may be used to transfer the data in the memory to the device usage database 125. As an example of another method, the sensor terminal 104 of the device side may connect to an internal network and transfer the device usage record stored in the memory of the sensor terminal 104 to the device usage database 125 without using the dedicated cradle.

With Example 1, data (usage records) on the operation status of devices can be acquired to improve the efficiency of research and development without causing the researcher, who is actually performing work, to perform any extra work and without impeding on experiments.

Example 2

Example 2 describes an example where a person involved in research and development (researcher) or a manager uses the research and development support system 106 to search for a device that belongs to the organization at which the researcher or manager works by using the device usage database 125 that stores the device usage record 800 acquired in Example 1, the researcher information database 127, the asset database 116, and the research theme database 108.

Figure 10:
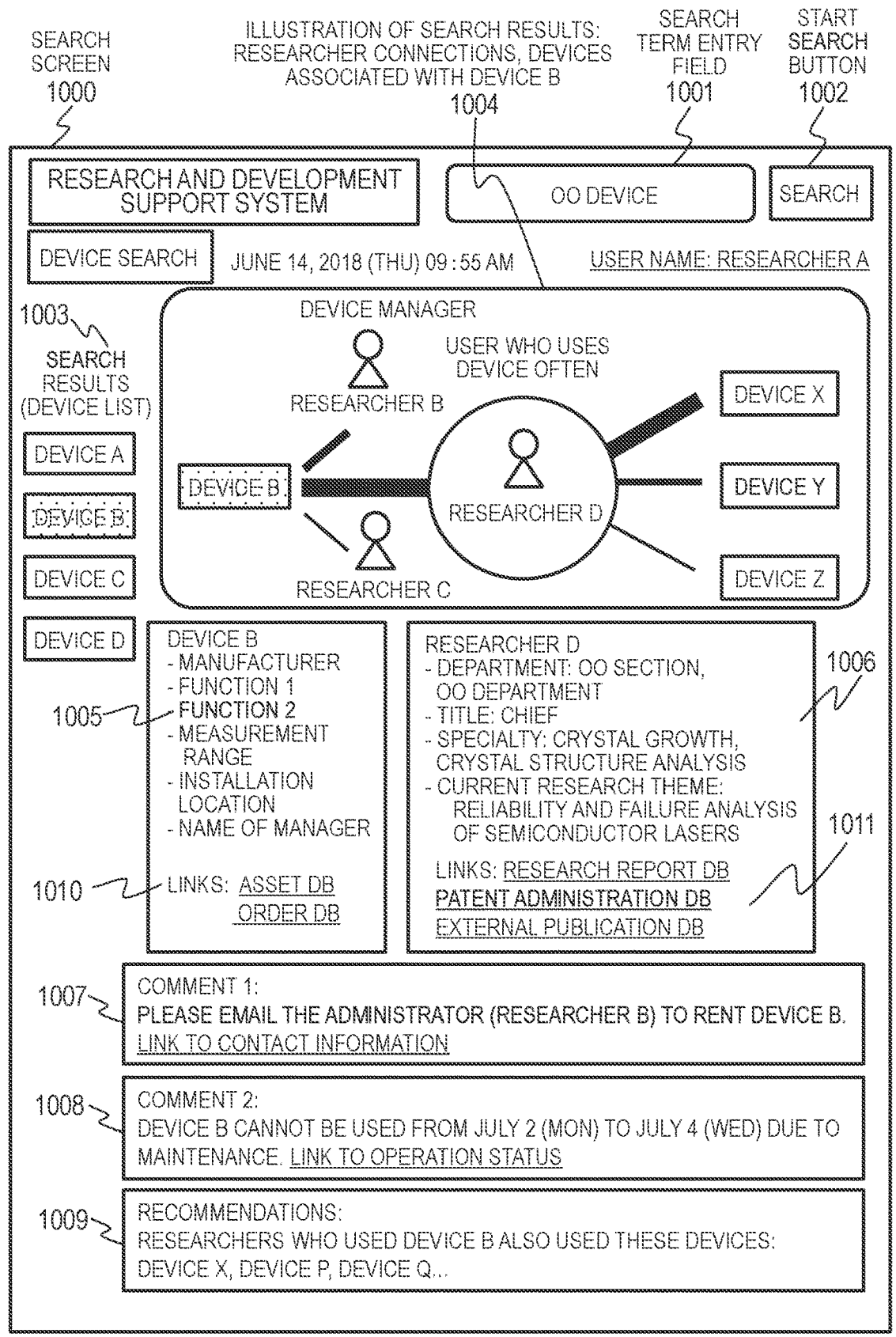
FIG. 10 is a diagram for illustrating an exemplary device search screen.

FIG. 10 is a diagram for illustrating an exemplary device search screen 1000. The administrative server 126 generates data for the device search screen 1000 such as that illustrated in FIG. 10 and transmits that data to the client terminal 124 (personal computer or tablet device) of the researcher or manager that is connected to the research and development support system 106. The client terminal 124 displays the device search screen 1000. The screen becomes a user interface when the researcher or manager searches for a device. Some of the information displayed on the device search screen 1000 illustrated in FIG. 10 may be omitted.

The device search screen 1000 includes a search term entry field 1001, a search button 1002, and a list 1003 generated from names of devices extracted as search results. If a specific device is specified from the search results, the device search screen 1000 can display a plurality of researchers (user group) that use the device in a display field 1004. The device search screen 1000 can also display information on device specifications and an installation location 1005 of the device.

The device search screen 1000 may include links 1010 to the asset database 116 and the order database 117. If more detailed information is required, the person conducting the search can access the asset database 116 and the order database 117 from the links 1010 to extract additional information.

If a specific researcher is specified in the display field 1004 from among the group of users who use the device, the device search screen 1000 can display properties 1006 on the researcher such as department, title, specialty and current research theme. If more detailed information on the researcher is required, the person conducting the search can click on links 1011 to relevant databases to extract additional information from those databases.

The device search screen 1000 can also display associated information that is not included in the search keywords but that the person who conducted the search can reference, such as information 1007 on lending devices and information 1008 on device maintenance. The device search screen 1000 can also display associated information 1009 that is obtained using recommendation technology.

Next, the database groups used when acquiring the information displayed on the device search screen 1000 and the information stored in the databases are described. FIG. 11A is a diagram for illustrating an exemplary device usage information 1100 that is stored in the device usage database 125 in the research and development support system 106. FIG. 11B is a diagram for illustrating an exemplary information 1110 on device reservation status that is stored in the device usage database 125.

FIG. 11A is a diagram for illustrating an example of the information 1100 on device usage records generated when the researcher uses a device. As illustrated in FIG. 8, the sensor terminal stores the device usage record 800 that includes the record number 801, the researcher ID number 402, the device ID number 501, the usage start time 704, and the usage end time 705. Data on device usage records is transferred to and stored in the device usage database 125 from various sensor terminals belonging to researchers or devices. While raw data that has not been processed such as that described above may be used without being processed, in the example illustrated in FIG. 11A, the transferred raw data on the device usage record is integrated to improve ease of use.

In the example illustrated in FIG. 11A, the device usage information 1100 includes a registration number 1101, the device ID number 501, the researcher ID number 402, usage time per month 1102 and total usage time 1103, which is generated by integrating the above data. The registration number 1101 may reflect the identification number of a data terminal that transmits data or the record number 801 of a device usage record stored in the data terminal. The device usage database 125 preferably includes the raw data 800 of the device usage records received from the sensor terminal and the device usage information 1100 that has been integrated as illustrated in FIG. 11A. In addition, the device usage database 125 is preferably configured such that the raw data 800 and the device usage information 1100 can reference each other. The device usage information 1100 may include names of devices and/or names of researchers (names of users).

FIG. 11B is a diagram for illustrating an example of information 1110 related to device usage reservation that is stored in the device usage database 125. The device reservation information 1110 includes the device ID number 501, a device name 1111, a name of device manager 1112, the researcher ID number 402, contact information 1113 such as an email address of the device manager, a date 1114 on which the device was reserved, a name of the person who made the reservation 1115 and the researcher ID number 402, a status 1116 that indicates if the reservation was approved, and special considerations 1117. A device can be reserved using scheduling software that is currently on the market, and this information may be reflected in the device reservation information 1110.

FIG. 12A is a diagram for illustrating an example of device asset information 1200 that is stored in the asset database 116 in the research and development support system 106. The asset information 1200 consists of an asset number 1201 unique to each device, a name of asset 1202, a name of asset manager 1203 and the researcher ID number 402, an installation location 1204, a purchase date 1205, a price recorded in a ledger (book price) on a specific date 1206, a name of manufacturer 1207 of the device, device specifications 1208, and associated information 1209 such as information on accessories, information on device modification and information on stocktaking. The asset number 1201 and the name of asset 1202 that are unique to each device can be used as the above-described device ID number 501 and the name of device 1111, respectively.

FIG. 12B is a diagram for illustrating an example of researcher information 1250 that is stored in the researcher information database 127 in the research and development support system 106. The researcher information 1250 includes the researcher ID number 402, a name of researcher 1251, a department of researcher 1252, a title of researcher 1253 and a specialty of researcher 1254 that are unique to each researcher.

FIG. 13A is a diagram for illustrating an example of information 1300 related to research and development themes in the organization that is stored in the research theme database 108 in the research and development support system 106. The information 1300 on research and development themes includes a client number 1301 that indicates the business that has requested research and development or a related business, and further a research number 1302, a research and development theme name 1303, a research period 1304 for the research and development theme, a research budget 1305, and names of researchers 1306 working on the research and development theme and the researcher ID number 402 that are unique to each research and development theme. Information 1307 on the progress of research and development at a specific date and time may be added to the above information.

FIG. 13B is a diagram for illustrating an example of information 1310 related to a research plan for any research and development theme that is stored in the research theme database 108 in the research and development support system 106. The information 1310 on research plans includes the research number 1302, the research and development theme name 1303 and the research period 1304 unique to each research and development theme, and a goal 1315 of the research and development theme, implementation items 1316 as specific research plans, and milestones 1317. Information linking to weekly reports 1318 that are created during research and development, meeting materials 1319, and others may be added. The weekly reports and meeting materials serve as information related to research and development themes and may be stored in the research theme database 108.

FIGS. 14, 15 and 16 are figures for illustrating exemplary information that is stored in the internal patent database 109, the research report database 110, and the external publication database 111 in each system.

FIG. 14 is a table of information 1400 on internal patents and includes an internal filing number 1401 related to a patent application, a name of patent 1402, a name of researcher as inventor 1403 and researcher ID number 402, the name 1303 and research number 1302 of the research and development theme that served as the basis for the invention, an internal filing date 1404 of the patent specification, an application number 1405, and an application date 1406. Information on the publication number and date of the patent application and how the patent application progresses (if examination is applied for, patent number, etc.) may also be added.

FIG. 15 is a table of information 1500 on research reports and includes a research report number 1501, a name of report 1502, a name of researcher 1503 and researcher ID number 402 who wrote the report, the name 1303 and research number 1302 of the research and development theme that served as the basis for the report, a report date 1504, and keywords 1505 related to the content of the report for searching. Other information may also be added.

FIG. 16 is a table of information 1600 on external publications. The term "external publication" herein refers to any data submitted to another organization such as an oral presentation or a presentation in the form of a poster to an academic society, a paper submitted to a journal, an article on a specialized topic, or results of research and development submitted to an external organization such as a press release. The information table includes an internal filing number 1601, a title of publication 1602, a name of publication media 1603 such as an academic society or journal, a publication date 1604, a name of researcher who made publication 1605 and the researcher ID number 402, the research and development theme name 1303 and research number 1302 that served as the basis of the external publication, and keywords 1606 related to the content of the report for searching. Other information may also be added.

Figure 17:
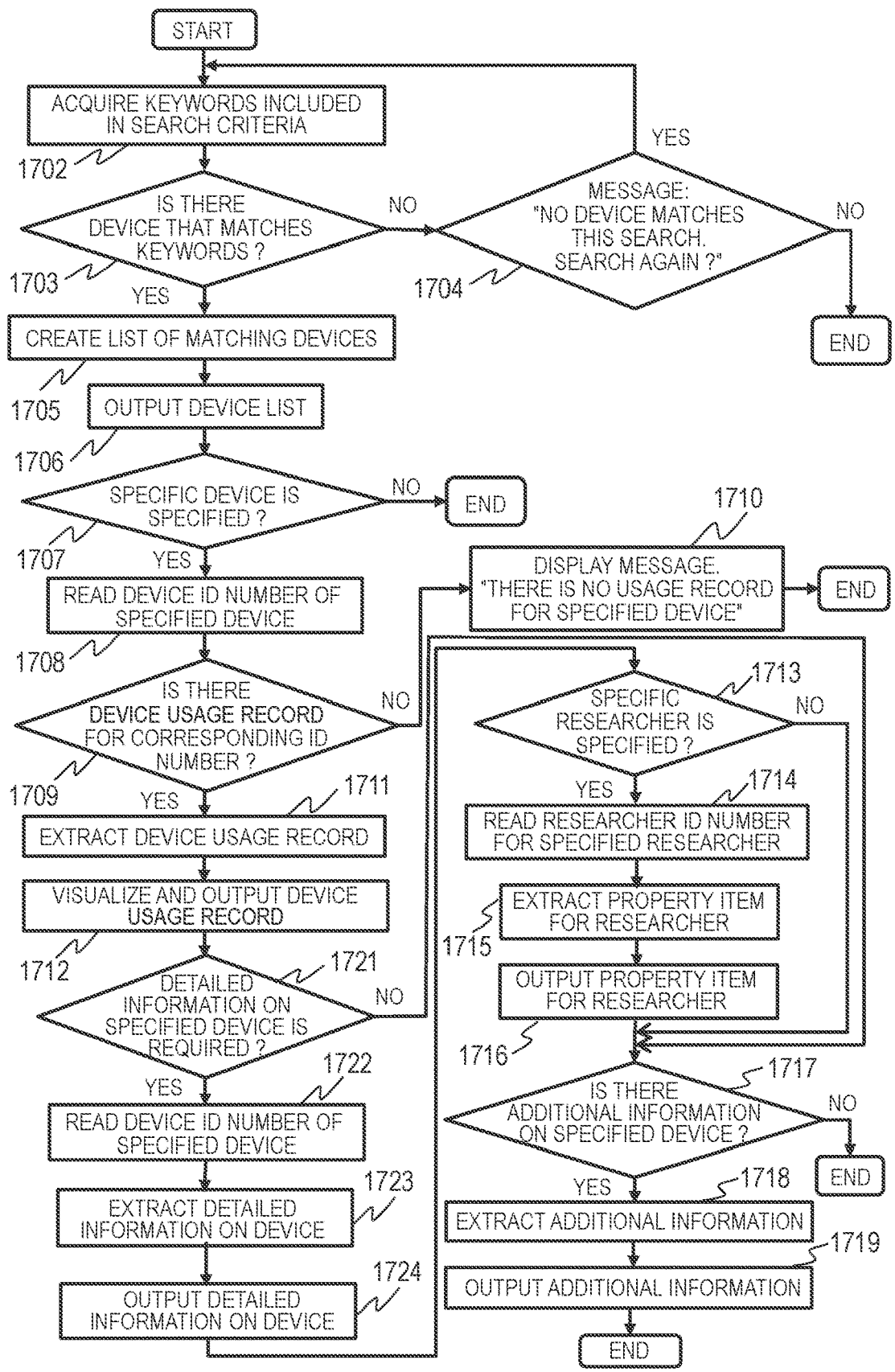
FIG. 17 illustrates an information processing flow for a method of acquiring the information displayed on the device search screen.

Next, a method of acquiring the information displayed on the device search screen 1000 is described with reference to the information processing flow illustrated in FIG. 17. First, the person conducting the search inputs search keywords to the search term entry field 1001 illustrated in FIG. 10 in the client terminal 124. A plurality of keywords may be input. Names relating to devices are also counted as keywords. The names relating to devices refer to some or all of the names of devices. In addition, the place at which the device is located, characteristics in device specifications and other information may be input as search keywords. The names relating to devices and additional keywords input as keywords form search criteria.

The administrative server 126 of the research and development support system receives the search criteria from the client terminal 124 and acquires one or a plurality of keywords from the search criteria (1702).

In the next step, the administrative server 126 searches the asset database 116 with the name of device 1202 that either matches or is close to the keyword and the asset number 1201 (or 501) (1703). If a corresponding entry exists (1703: YES), the administrative server 126 extracts the name 1202 and asset number 1201 of the corresponding device and forms a list with this information in descending order of priority (1705). At this time, the administrative server 126 extracts, along with the name of the device, the asset number 1201 (device ID number) stored in the asset database 116, the name of manager 1203, the installation location 1204 and other information.

If there are no corresponding entries in the search results (1703: NO), the administrative server 126 can display a message to that effect on the device search screen 1000 and urge the user to input other search keywords (1704). The administrative server 126 displays a predetermined number of entries on the search screen 1000, sorting the listed group of devices in descending order of priority.

On the client terminal 124, the person conducting the search can specify a specific device from among the devices in the device group displayed as search results in Step 1706 and further display details regarding the use of that device. When a specific device is specified (1707: YES), the administrative server 126 reads the ID number 501 of the specified device from a request sent from the client terminal 124 (1708).

The administrative server 126 searches for the corresponding device ID in the device usage database 125. If there is a usage record for the corresponding device ID (1709: YES), the administrative server 126 extracts the ID number 402 of the researcher that is using the device and the information 1103 relating to device usage time for each user from the device usage database 125 (1711) and generates a list of devices in descending order of frequency of use (1712). Frequency of use is determined according to, for example, total usage time over a predetermined number of months. In addition, the administrative server 126 extracts the name of researcher 1251, the department 1252, the title 1253 and the specialty 1254 that are all information on the ID number 402 of the researcher from the researcher information database 127. At this time, as illustrated in the display field 1004 in FIG. 10, the relationship between the device and the user can be displayed in an easy-to-understand manner in the form of a diagram. If there is no usage record for the specified device (1709: NO), the administrative server 126 displays a message to that effect (1710).

The person conducting the search can further display detailed information relating to assets for the device specified from the device group displayed as search results. Such detailed information includes the name of the manufacturer, specifications, the installation location and the name of the device manager. If asset information on the specified device is required (1721: YES), that is, the administrative server 126 has received a request for asset information on the specified device from the client terminal 124, the administrative server 126 reads the device ID number of the specified device from the request (1722), extracts detailed information on the device from the asset database 116 (1723) and outputs that information (1724).

The person conducting the search can also specify a specific researcher from a plurality of researchers displayed as search results to further display information related to that researcher. If a specific researcher has been specified (1713: YES), that is, the administrative server 126 has received a request for information on the specified researcher from the client terminal 124, the administrative server 126 reads the ID number 402 of the researcher from the request (1714). The administrative server 126 may extract information related to research such as the research theme of the researcher from the research-related database group 107 including the research theme database 108, the internal patent database 109, the research report database 110, the external publication database 111 and the researcher information database 127 in the research and development support system 106 (1715), compile the extracted items and already extracted items such as the department, title and specialty of the researcher, and output the compilation of items (1716).

When a specific device has been specified and information associated with device usage or asset information exists in the device usage database 125 or the asset database 116 (1717: YES), the administrative server 126 can extract associated information from the device usage database 125 and/or the asset database 116 using the device ID number 501 (1718) and output the associated information (1719).

Examples of the associated information include the special considerations 1007 related to device lending and the information 1008 related to device maintenance.

The administrative server 126 can store keywords used in searches and the search results in the dedicated database for search results 205. The database for search results and the database groups that are already connected to the research and development support system may be combined to form a database that can give recommendations. The administrative server 126 may use an algorithm or method to create a recommendation model. When a search keyword is input, new data and information associated with the keyword or the search results can be displayed as a recommendation (1717 to 1719).

The device search screen 1000 illustrated in FIG. 10 displays the names of devices being used by researchers who use a specific device as recommendation information 1009. The person conducting the search can obtain more specific information relating to devices if the associated information that includes recommendations includes more specific information. As a result, it is possible to simplify various conventional procedures used for device lending and in actual operation, meaning that research and development can be made more efficient.

Through using the research and development support system 106 as described above, it is easy to obtain information on devices required to conduct research and development, and hence research and development can be made more efficient.

Example 3

Example 3 is an example of a case where a person involved in research and development (researcher) or a manager uses the research and development support system 106 to search for the usage status of a specific device using the device usage database 125 that stores the device usage record 800 acquired in Example 1, the asset database 116 of the system 106 and the researcher information database 127 and the order database 117.

FIG. 18 is a diagram for illustrating an exemplary screen 1800 that is used to search for device usage status and is displayed as a user interface screen to the person conducting the search. Similar to Example 2, the administrative server 126 generates data on the screen such as that illustrated in FIG. 18 and transmits that data to the client terminal 124 that is connected to the research and development support system 106. As a result, the client terminal 124 can display the received screen of data. Some of the information displayed on the device usage status screen 1800 illustrated in FIG. 18 may be omitted.

A list 1803 of devices that match or are similar to specific criteria is displayed on the device usage status screen 1800. This list may be used in place of the results obtained in the device search explained in Example 2. The person conducting the search may input new search keywords related to a device into the search term entry field 1801 on the screen 1800 to display a list of devices that match or are similar to the search criteria on the device usage status screen 1800. The device usage status screen 1800 can also display a list of a device group that is managed by a user of the research and development support system 106.

If a specific device (the device B in the example in FIG. 18) is specified from the list of devices, the device usage status screen 1800 can display the usage status 1804 of the device along with the name of the device, the asset number of the device and the name of the device manager. The name 1805 and researcher ID number 402 of the researcher using the device, planned use time 1806 and actual usage time 1807 of the device in units of time such as weeks, months and six months for each user may be displayed as the device usage status.

The device usage status screen 1800 can also display time 1808 taken for maintenance and details 1809 of maintenance. If more detailed information on assets or device orders is required, the person conducting the search can click links 1810 to go to relevant databases and extract additional information from those databases. The device usage status screen 1800 can also display information 1811 obtained using recommendation technology as associated information that the person conducting the search can reference. Recommendation information on future maintenance periods such as that illustrated in FIG. 18 is provided.

Next, the database groups used when acquiring the information displayed on the device usage status screen 1800 and the information stored in the databases are described. The device usage database 125, the asset database 116 and the researcher information database 127 have already been described with reference to FIGS. 11, 12A and 12B. FIG. 19 is a diagram for illustrating an example of information 1900 related to ordering that is stored in the order database 117.

The ordering information 1900 includes an order number 1901 that is unique to each order, a name of order 1902, a type of order 1903, a name of orderer 1904 and the researcher ID number 402, a budget number 1905 that identifies the department that paid for the order or the research and development theme, an order date 1906 and delivery date 1907 for the order, a name of receiver 1908, and an order price 1909. Any other information relating to ordering can be added as special considerations 1910. For example, if the name of order includes the name of device, the asset number of the device may be input in advance as a supplementary item.

Figure 20:
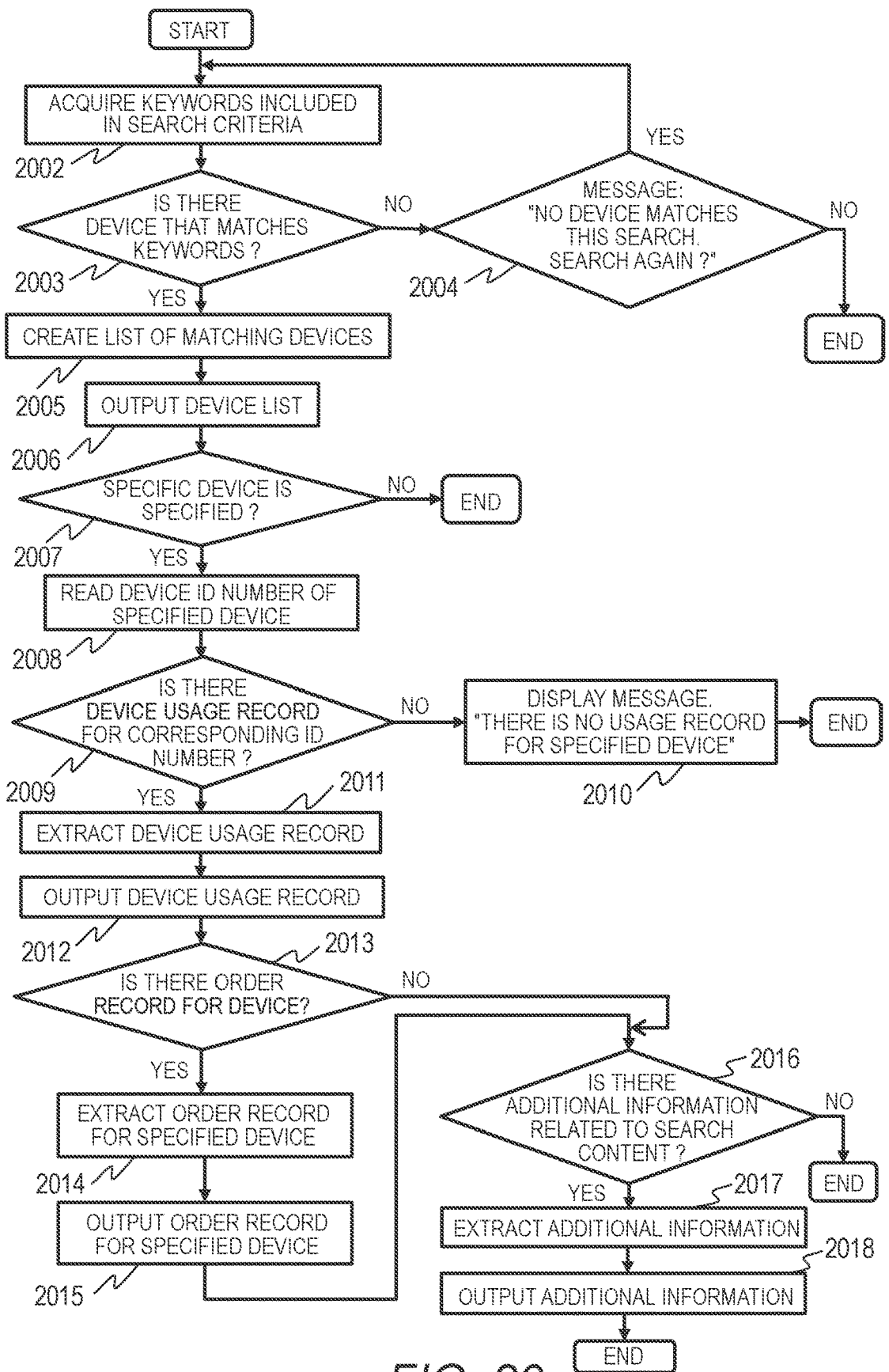
FIG. 20 illustrates an information processing flow for a method of acquiring the information displayed on the device usage status screen.

Next, a method of acquiring the information displayed on the device usage status screen 1800 is described with reference to the information processing flow illustrated in FIG. 20. When searching for device usage status, the steps until acquiring the usage record of the device that matches specific criteria are the same as the steps described in Example 2.

More specifically, the person conducting the search inputs keywords including the name of device to the search term entry field 1801 in FIG. 18 on the client terminal 124. The administrative server 126 in the research and development support system acquires search criteria including the keywords from the client terminal 124 (2002), searches for names of devices that match or are similar to the keywords in the asset database 116 and extracts those names (2003).

The administrative server 126 makes a list of the search results in descending order of priority (2005) and displays the list on the screen (2006). At this time, the administrative server 126 extracts device ID numbers 501 along with the names of the devices. If there are no corresponding entries in the search results (2003: NO), the administrative server 126 can display that information on the device search screen and urge the user to input other search keywords (2004).

The person conducting the search can specify a specific device from the device group displayed as search results in the above step to cause the usage status of that device to be displayed on the screen. If a specific device is specified from the client terminal 124 (2007: YES), the administrative server 126 reads the ID number 501 of the device (2008) and searches for a usage record for the device in the device usage database 125. If there is a usage record for the device (2009:

YES), the administrative server 126 extracts the usage record for the device (1100 and 1110) (2011) and displays the usage record on the screen (2012). The researcher information database 127 may be referenced if necessary. If there is no usage record (2009: NO), the administrative server 126 displays that fact (2010).

At this time, as illustrated in FIG. 18, the administrative server 126 can display planned use time and actual use time of the device in units of time such as weeks, months and six months for each researcher that uses the device in a usage status field 1804. In addition, if there is a maintenance time 1808 during which the device could not be used for experiments due to a scheduled or temporary repair, the administrative server 126 can also extract a maintenance record relating to the maintenance from the device usage database 125 and display the maintenance record on the screen 1800.

If there is order information (order records) 1900 relating to repair, scheduled maintenance, modification work or ordering parts for the device specified in the above-described step, the administrative server 126 can also display information on records of these events. At this time, the administrative server 126 extracts an ordering record relating to the device (2014) from the order database 117 in the system 106 using the ID number 501 of the device or name of the device (1111 or 1202) (2014) and displays the ordering record on the screen (2015). Examples of the ordering information (1809) include implementation items, ordering numbers, company who accepted order and cost, but the information other than this information may also be displayed.

The administrative server 126 can store keywords used in searches and the search results in the dedicated database for search results 205. The dedicated database for search results 205 and the database groups that are already connected to the administrative server 126 may be combined to form a database that gives recommendations. This database serves as the basis for the associated information.

The administrative server 126 uses an algorithm or method to create a recommendation model. If new data or information associated with the keyword or the search results exists as the associated information when a search term is input (2016: YES), the additional information 126 can extract that data or information (2017) and display the data or information as a recommendation (2018).

FIG. 18 illustrates information related to future repair of a specific device as the recommendation information 1811. The person who conducted the search can obtain more specific information relating to devices if the associated information that includes recommendations includes more specific information. As a result, it is possible to simplify various conventional procedures used for device lending and in actual operation, meaning that research and development can be made more efficient.

Through using the research and development support system 106 as described above, it is easier than before to obtain information on the usage status of devices required to conduct research and development, and hence research and development can be made more efficient.

Example 4

Example 4 is an example of a case where a person involved in research and development (researcher) or a manager of research and development uses the research and development support system 106 to search for progress of a specific research and development theme using the device usage database 125 that stores the device usage record 800 acquired in Example 1, the asset database 116 and the research theme database 108 in the system 106.

FIG. 21 is a diagram for illustrating an exemplary screen 2100 for searching for progress of research and development and is displayed as a user interface screen to the person conducting the search. Similar to Examples 2 and 3, the administrative server 126 can generate data on the screen such as that illustrated in FIG. 21 and transmit the data to the client terminal 124 that is connected to the research and development support system 106. Then, the client terminal 124 displays the received data on the screen. Some of the information displayed on the progress screen 2100 illustrated in FIG. 21 may be omitted.

A list of one or a plurality of research and development themes 2103 may be displayed on the progress screen 2100 for research and development as themes that match or are similar to specific criteria. In response to one research and development theme being specified, the progress screen 2100 can display the name 2104 and the research number 2105 of the research and development theme, a research plan 2106, and a list 2107 of researchers who are working on the research theme. This information is acquired from the research theme database 108.

In response to a specific researcher being specified from the list of researchers, the progress screen 2100 can display the type of device used by the researcher for the research and development theme and usage time of the device as a device usage status 2108. If information on planned use of the device has been created at the time when a research and development plan for the research and development theme was created, the progress screen 2100 can display both the information and actual device usage. Information on device usage time can be collectively displayed in any unit of time such as weekly or monthly for each device.

The progress screen 2100 may include links 2109 to experiment data obtained through implementing the research and development theme and a data analysis system, which is a dedicated system for analyzing the data. The person conducting the search can extract additional information from appropriate databases from the links 2109. The person conducting the search can also extract additional information from appropriate databases from a link 2109 to materials generated through implementing the selected research and development theme.

Examples of such materials include external publications such as weekly reports, progress meeting reports, research reports, patent specifications, presentations at conferences, papers and press releases, or databases related to research at another company (databases on physical properties or papers). Links may also be provided to deliverables other than those described above.

As described above, the progress screen 2100 for research and development in the research and development support system 106 makes it possible to check the progress of a specific research and development theme that is currently being worked on and the status of deliverables, which can reduce the work of research and development managers. The screen 2100 may also display associated information relating to research and development progress as a recommendation 2110.

Figure 22:
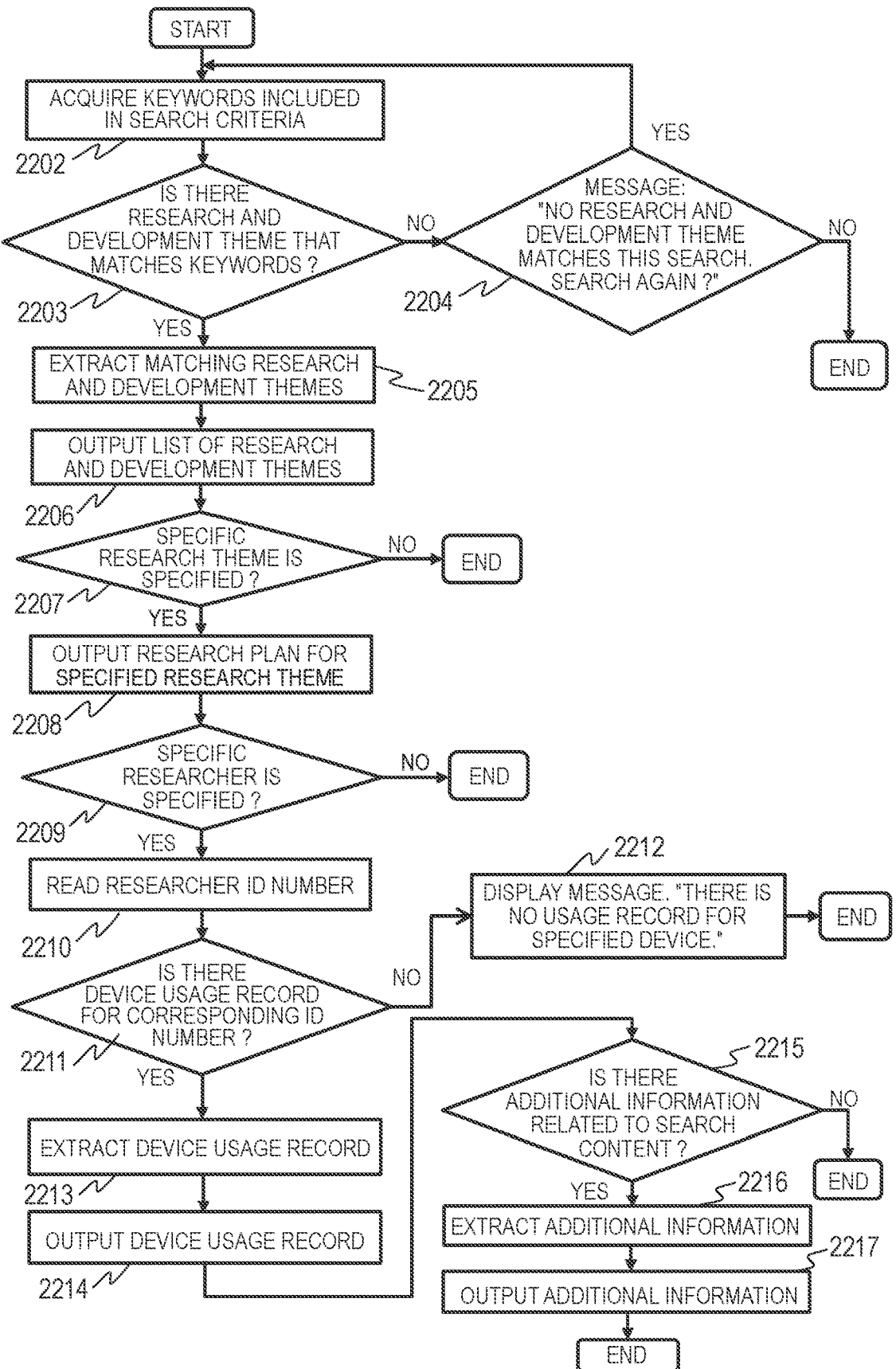
FIG. 22 illustrates an information processing flow for a method of acquiring the information displayed on the screen for searching for progress of research and development.

Next, a method of acquiring the information displayed on the screen for searching for progress of research and development is described with reference to the information processing flow illustrated in FIG. 22. The databases used are the research theme database 108, the device usage database 125 and the asset database 116. These databases have already been described with reference to FIGS. 13, 11 and 12A. First, the person conducting the search inputs search keywords to the search term entry field 2101 illustrated in FIG. 21 in the client terminal 124.

A plurality of search keywords can be input, but a keyword corresponding to all or part of the name of the research and development theme must be included. The client number, research number, research period, and name or ID number of the researcher may also be input. The input keywords form search criteria that the administrative server 126 acquires from the client terminal 124 (2202).

In the next step, the administrative server 126 searches the research theme database 108 for names 1303 of research and development themes that matches or are similar to the keywords (2203) and extracts the names (2205). The administrative server 126 then makes a list of the search results in descending order of priority. At this time, the administrative server 126 also extracts the research numbers 1302, information 1310 on research plans that include research content and milestones, and the names 1306 and researchers ID numbers 402 of the researchers who are working on the themes alongside the research and development theme names 1303.

If there are no corresponding entries in the search results (2203: NO), the administrative server 126 can display a message to that effect on the progress screen 2100 and urge the user to input other search keywords (2204). The administrative server 126 displays a predetermined number of groups of listed research and development themes in descending order of priority (2206).

The person conducting the search can specify a specific research and development theme from among the groups research and development themes displayed in the above-described step from the client terminal 124 (2207) to display a plan related to the research and development theme and the names of researchers who are working on the research and development theme on the administrative server 126 (2208).

The person conducting the search can also specify a specific researcher from the researchers who are working on the research and development theme from the client terminal 124 and display the progress of the researcher on the administrative server 126. If a specific researcher is specified (2209: YES), the administrative server 126 reads the researcher ID number 402 of the researcher (2210) and extracts the names 1202 of the devices used by the researcher and the usage times 1102 and 1103 from the device usage database 125 and the asset database 116 in the research and development support system 106 (2213).

If information on planned use of the device has been created at the time at which the research and development plan for the research and development theme was created, the administrative server 126 can display extract planned usage information for each device from the device usage database 125 based on the researcher ID number 402 of the researcher and display the planned usage information alongside actual device usage. Next, the administrative server 126 outputs device usage time and planned usage time together with the research plan (2214). If the research plan is described in units of months, the usage time and planned usage time for each device used by the researcher are preferably also described in units of months. However, the usage time and planned usage time may be displayed in another way.

Similar to Examples 2 and 3, the dedicated database for search results 205, which stores keywords used in searches and search results can be combined with other database groups in the system to form a database that gives recommendations. The administrative server 126 can use a recommendation model to extract new information associated with the input search keywords or the search results from the database groups (2216) and display that information as a recommendation (2217).

FIG. 21 illustrates an example of recommendation information 2110 as information related to progress of a portion overseen by a researcher who is working on a specific research plan. When the associated information that includes recommendations includes more specific information, the person conducting the search can also gain an understanding of the progress of research and development from the usage status of the device in addition to conventional weekly reports and meeting materials. As a result, progress of research and development can be checked without requiring extra time, and hence research and development can be made more efficient.

Figure 23:
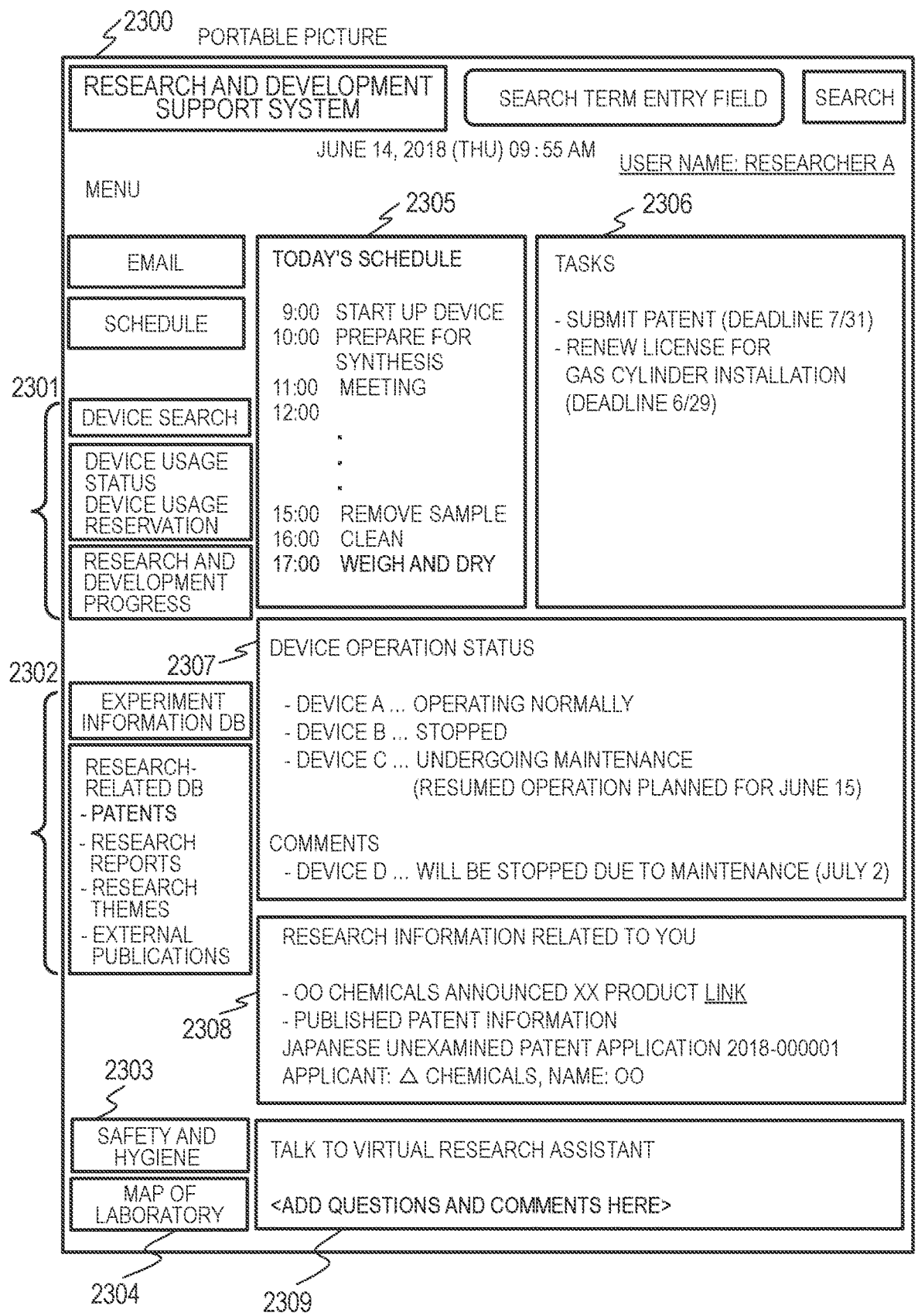
FIG. 23 is an example of a portal screen in the research and development support system.

FIG. 23 is an example of a portal screen 2300 in the research and development support system 106. In each of the searches described in Examples 2 to 4, it is possible to travel to the search screen from this portal screen. Some of the information displayed on the portal screen 2300 illustrated in FIG. 23 may be omitted.

The portal screen 2300 includes links 2301 to various searches, links 2302 to various databases, a link 2303 to a portal related to experiment safety, and links 2304 to laboratory maps with the layout of devices in laboratories. The administrative server 126 can work together with commercially available scheduling software to display the schedule 2305 and tasks 2306 of each individual user. A schedule related to the user in the research theme database 108 or the device usage database 125 may also be displayed as content of the schedule or task.

In addition, a display field 2307 may be provided. The display field 2307 allows a user or a manager to easily check the operation statuses of devices that are always executing. The operation statuses of these devices are preferably displayed by the administrative server 126 can use the recommendation function to also display information on products made by other companies and patent applications related to research and development of the user (2308).

A research and development chat bot that uses artificial intelligence (AI) may be connected to the administrative server 126 as an extension of the system of this Example (2309). As a personal research assistant, the chat bot uses the recommendation function in the administrative server 126 to automatically provide the most appropriate answers to various questions input by the user. Content exchanged between the chat bot and the user can also be stored in the dedicated database 205 and used as data to improve the recommendation function.

Through using the research and development support system 106 as described above, it is easier than before to obtain information on the progress of research and development required to conduct research and development, and hence research and development can be made more efficient.

Example 5

Example 5 is an example of a case where a person involved in research and development, in particular a researcher who conducts experiments, uses the research and development support system 106 to manage and search for peripheral information relating to experiments including experiment data by using the research theme database 108 in the system, the device usage database 125 and the experiment information database 113.

Figure 24B:
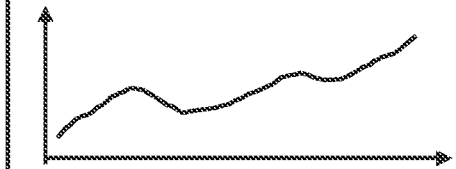

FIGS. 24A and 24B illustrate a diagram for illustrating an exemplary experiment information management screen 2400 that is used by a researcher to manage and search for experiment information. The experiment information management screen 2400 is displayed as a user interface screen to the person conducting the search. The administrative server 126 generates data on the screen such as that illustrated in FIGS. 24A and 24B and sends that data to the client terminal 124 connected to the research and development support system 106. Then, the client terminal 124 can display the received data on the screen. Some of the information displayed on the experiment information management screen 2400 illustrated in FIGS. 24A and 24B may be omitted.

A list 2403 of research and development themes that match or are similar to specific criteria is displayed on the screen 2400. When a specific research and development theme is selected from the list, the experiment information management screen 2400 can display a research plan 2404 for the theme that includes research content and milestones. The experiment information management screen 2400 can also display a device usage status 2416 of the researcher for the research and development theme.

The experiment information management screen 2400 can also display information 2405 and 2415 obtained using recommendation technology as associated information that can be referenced by the person conducting the search. As an example, FIGS. 24A and 24B illustrates the recommendation information 2415 as information on the progress of research and development and the information 2405 as information that is used by the researcher as a reference for the research and development theme.

On the experiment information management screen 2400 illustrated in FIGS. 24A and 24B, information generated by implementing the specified research and development theme can be managed in the experiment information database 113. This information includes electronic experiment note data 2406, hand-written experiment notes 2407 electronized in PDF form or another form, hand-written research ideas 2408, notes on thoughts 2409 such as experiment results, experiment data 2410 obtained from experiment devices, and figures 2411 in which the above data is compiled. The above-described information appropriately reflects results of research performed by the researcher.

All of the above-described information is electronized data that can be input into a computer. The experiment information management screen 2400 may be provided with buttons 2412 and 2413 that can be clicked to upload or download various types of information to/from the experiment information database 113 in order to improve usability. Links 2414 to the relevant research-related database group 107 and device usage database 125 may also be provided.

Information other than that described above, such as information associated with research and development including information on performing experiments, may also be stored in the experiment information database 113. The information associated with performing experiments, such as environmental information including temperature and humidity of a laboratory, can be automatically acquired using sensors and stored in the relevant databases. Data relating to individuality of experimenters such as procedures for mixing a plurality of materials, detailed experimentation processes and know-how on how to use experiment devices can also be acquired from still images or moving images. This data can be stored in the experiment information database 113.

Next, the database groups used to acquire the information displayed on the screen in FIGS. 24A and 24B and the information stored in those databases is described. The research theme database 108 and the device usage database 125 have already been described with reference to FIGS. 13 and 11. FIG. 25 is a diagram for illustrating exemplary experiment information 2500 that is stored in the experiment information database 113.

The table of experiment information 2500 includes an internal filing number 2501 that is used to distinguish information, a name of researcher 2502 and the researcher ID number 402 of the researcher that created the information, the name 1303 and research number 1302 of the research and development theme that served as the basis for generating the experiment information, a type 2503 of the experiment information, a file type 2504, and a registration date 2505.

Other information such as whether the information has been approved by a manager and the date of approval may be added as necessary. Types of experiment information include electronic or hand-written experiment notes, experiment data, graphs or diagrams of experiment data, notes on thought processes such as experiment results, and notes of ideas related to research and development. Other information associated with experiments such as environmental data on the temperature and humidity of a laboratory, or moving images recording experiment-related know-how, can be registered in the experiment information database 113.

Figure 26:
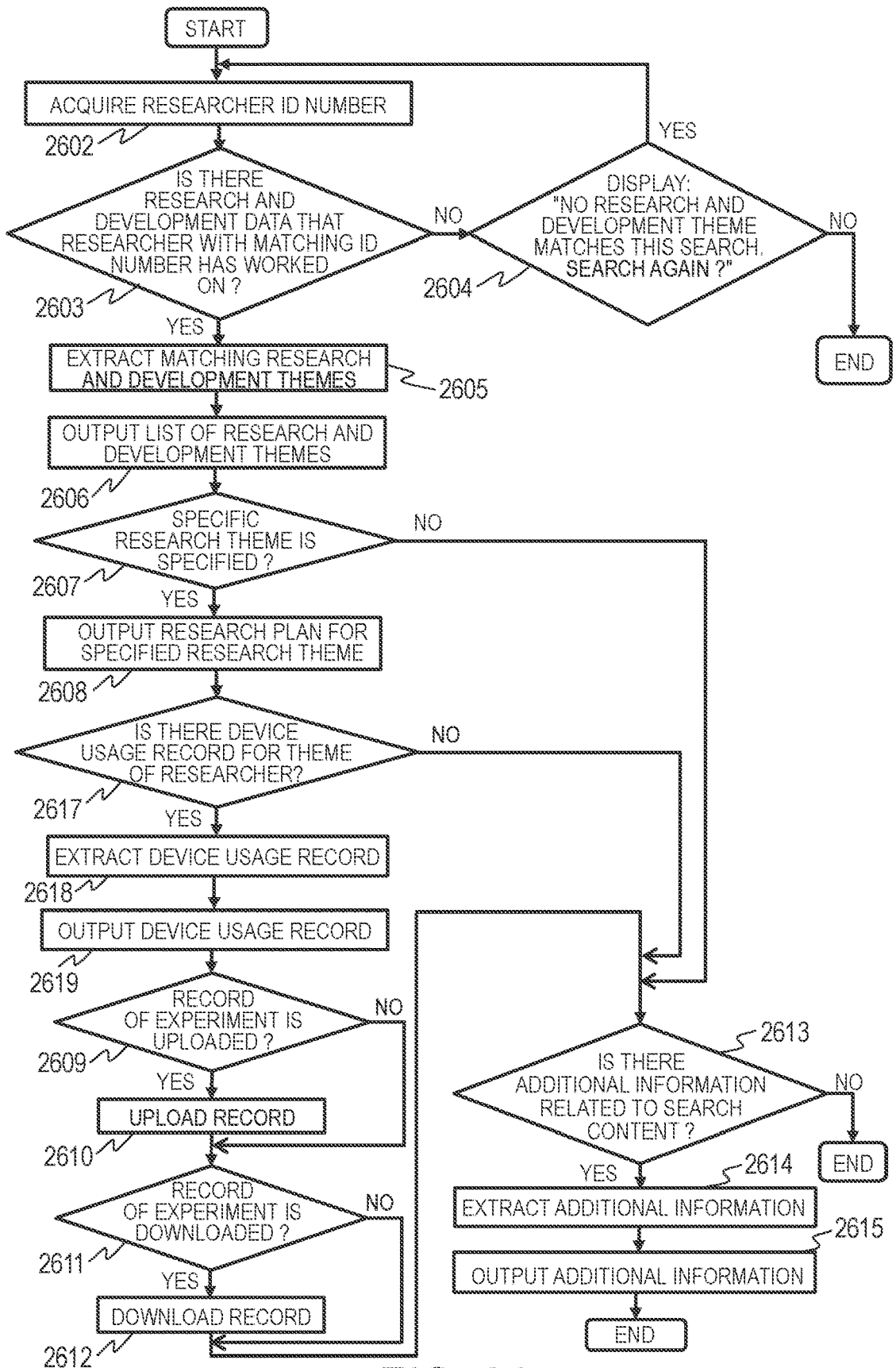
FIG. 26 illustrates an information processing flow for a method of acquiring the information displayed on the experiment information management screen.

Next, a method of acquiring the information displayed on the experiment information management screen 2400 is described with reference to the information processing flow illustrated in FIG. 26. The databases used are the research theme database 108, the device usage database 125 and the experiment information database 113. These databases have already been described with reference to FIGS. 13, 11 and 25, respectively.

The researcher (person conducting the search) inputs the name 2505 of a researcher or the researcher ID number 402 into the search term entry field 2401 on the experiment information management screen 2400 illustrated in FIGS. 24A and 24B. The administrative server 126 acquires the input researcher ID number 402 from the client terminal 124 (2602) and searches the research theme database 108 for the research theme that the researcher is working on (2603). If a corresponding entry exists (2603: YES), the administrative server 126 extracts the name 1303 and number 1302 of the research and development themes that the researcher having the input researcher ID number 402 is working on from the research theme database 108 (2605), makes a list with this information in descending order of priority and displays the list on the screen (2606). If there are no corresponding entries (2603: NO), the administrative server 126 displays information to that effect on the screen (2604).

The person conducting the search can specify a specific research and development theme name 1303 from the group of research and development themes displayed in the previous step (2607) to display the plan 1301 for the research and development theme on the administrative server 126 (2608). If there is a device usage record by a researcher for the research and development theme (2617: YES), the administrative server 126 extracts the device usage record from the device usage database 125 and displays the device usage record on the screen (2618, 2619). The asset database 116 may be used in addition to the device usage database 125 to extract names of devices.

The person conducting the search can upload obtained experiment information relating to the research and development theme name 1303 from the client terminal 124 to the experiment information database 113 when necessary (2609, 2610). Examples of experiment information that can be uploaded include electronic or hand-written experiment notes, experiment data, graphs or diagrams of experiment data, notes on thought processes such as experiment results, and notes of ideas related to research and development. Other information that will be associated with experiments in the future such as environmental data on the temperature and humidity of a laboratory, or moving images recording experiment-related know-how, can also be registered in the database. A plurality of pieces of information may be uploaded.

The person conducting the search can access the experiment information database 113 from the client terminal 124 as needed to download specific experiment information from the experiment information database 113 among the obtained experiment information relating to the research and development theme name 1303 (2611, 2612). At this time, a plurality of pieces of information may be downloaded.

Similar to Examples 2 to 4, the dedicated database for search results 205 that stores keywords used in searches and the search results and other database groups in the system may be combined to form a database that gives recommendations. The administrative server 126 can use a recommendation model to extract new information associated with the input search keywords or the search results and display that information as a recommendation (2613 to 2615).

FIGS. 24A and 24B illustrates examples of recommendation information as information on products manufactured by other companies, information on patent applications by other companies, papers 2405 that can be referenced, and progress 2415 related to the research and development theme of the person conducting the search. By including more detailed information in the associated information that includes recommendations, the person conducting the search can proceed with research and development while checking the trends of other companies and societies. As a result, the person conducting the search can easily proceed with their research and development theme without spending extra time checking the trends of other companies, which means that research and development can be made more efficient.

Through using the research and development support system 106 as described above, it is easier than before to obtain experiment information that is required to conduct research and development, and hence research and development can be made more efficient.

Example 6

Example 6 is an example of a case where the research and development support system 106 is used to effectively search for information on research and development particularly in material fields using the research-related database group 107 including the research theme database 108 and the device usage database 125.

Figure 27:
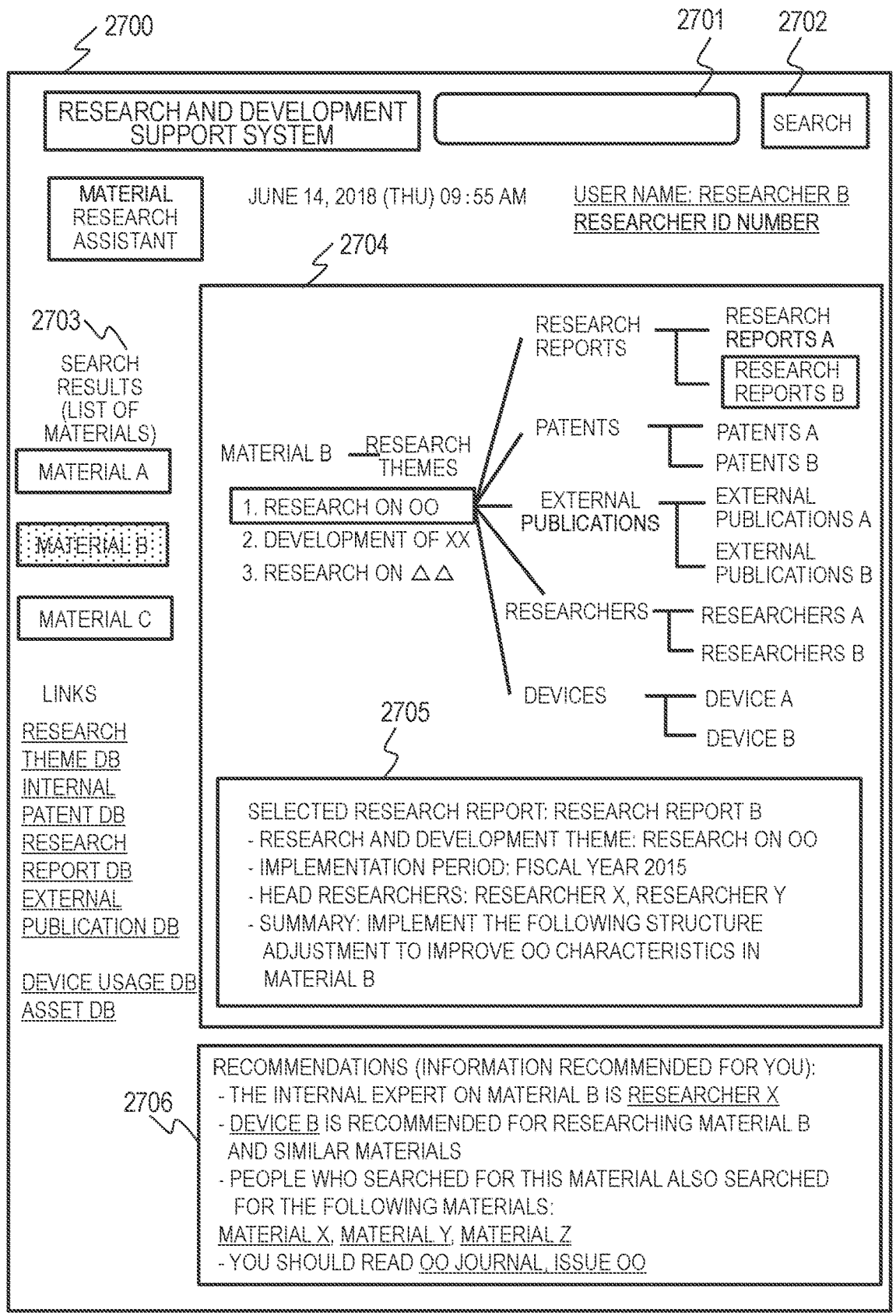
FIG. 27 is a diagram for illustrating an exemplary material research assistance screen that is to assist a researcher when collectively searching for research information in a material field in an organization.

FIG. 27 is a diagram for illustrating an exemplary material research assistance screen 2700 that is to assist a researcher when collectively searching for research information in a material field in an organization. This screen is displayed as a user interface screen to the person conducting the search. The administrative server 126 generates data on the screen such as that illustrated in FIG. 27 and sends the data to the client terminal 124 that is connected to the research and development support system 106. Then, the client terminal 124 can display the received data on the screen. Some of the information displayed on the material research assistance screen 2700 illustrated in FIG. 27 may be omitted.

The person conducting the search inputs the names of materials as search keywords. Additional search keywords such as the research and development theme name 1303, the name (title) 1502 of a report published by a researcher, information on patents or external publications, names of researchers, and names of devices (1111 or 1202) can also be input. Based on the search criteria formed from the search keywords, a list 2703 of names of materials that match or are similar to specific criteria is displayed on the material research assistance screen 2700. If a specific material is selected from the list, the material research assistance screen 2700 can also display data 2704 including display research and development themes, research reports, patents, external publications, researchers, and experiment devices related to the selected material.

Further, if more detailed information is required, the material research assistance screen 2700 can display detailed information 2705 for the corresponding entry. Associated information that can be referenced by the person conducting the search can also be displayed on the material research assistance screen 2700 alongside information 2706 obtained using recommendation technology. In FIG. 27, examples of recommendation information include the names of researchers who are knowledgeable about the searched material, the names of experiment devices that should be used with the material for research and development, the names of materials that were searched for by people who searched for the specific material, and academic information such as papers related to the material.

The database group used for acquiring the information displayed on the screen illustrated in FIG. 27 is the research-related database group 107 including the research theme database 108, the internal patent database 109, the research report database 110, the external publication database 111, and the researcher information database 127, and the device usage database 125 and the asset database 116. Tables of data stored in these databases have already been described in previous Examples, and hence a description thereof is omitted.

Figure 28:
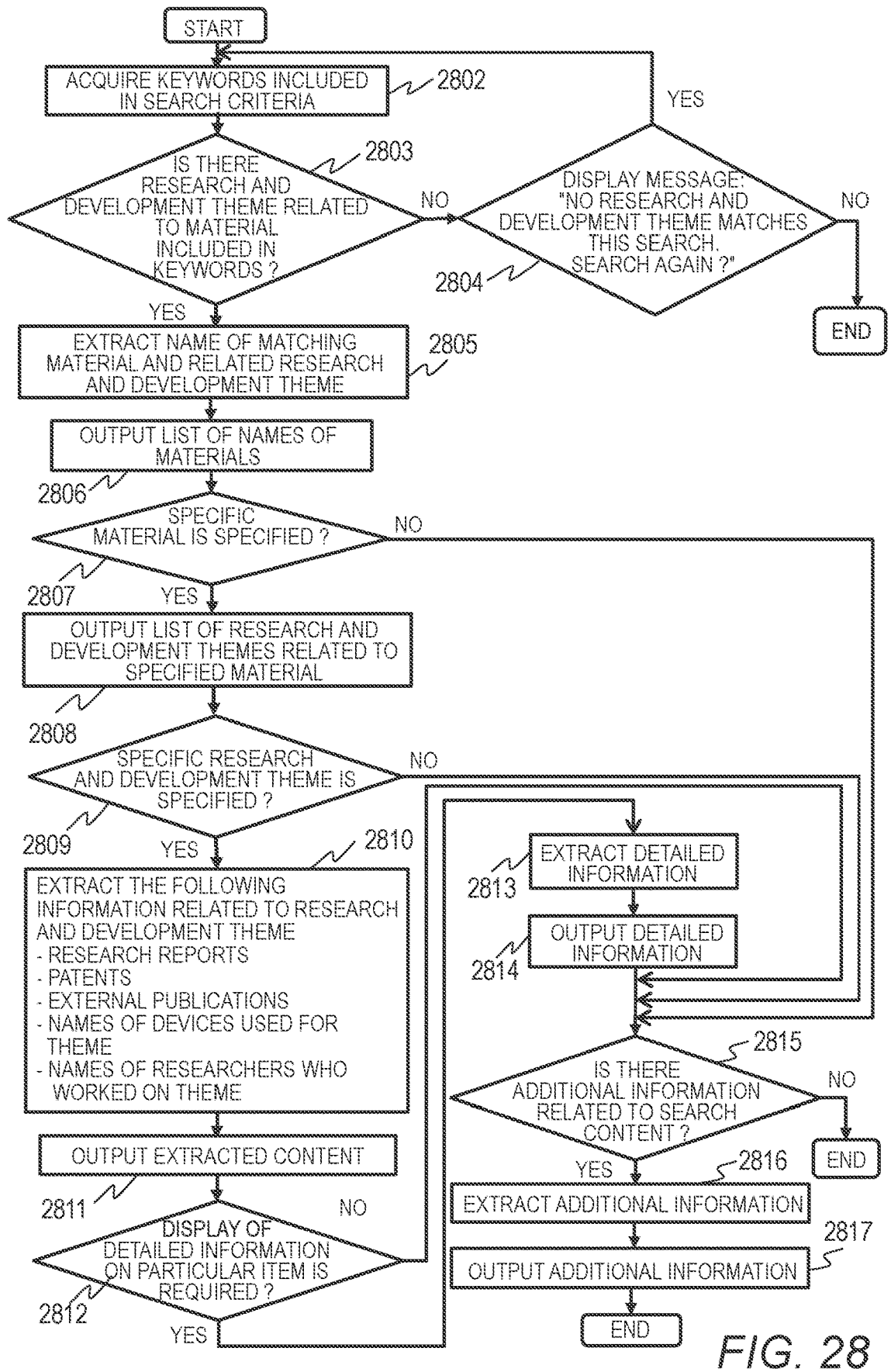
FIG. 28 illustrates an information processing flow for a method of acquiring the information displayed on a search screen for research information in material fields.

Next, a method of acquiring the information displayed on a search screen for research information in material fields is described with reference to the information processing flow illustrated in FIG. 28. First, the person conducting the search inputs search keywords to the search term entry field 2701 on the material research assistance screen 2700 illustrated in FIG. 27. A plurality of keywords may be input, but keywords including some or all of the names of materials must be included. In addition, names of research and development themes, titles of research reports, information on patents or external publications, names of researchers and names of devices can also be input.

The input keywords make up search criteria that are sent from the client terminal 124 to the administrative server 126 and are acquired from the administrative server 126 (2802). In the next step, the administrative server 126 searches the research theme database 108 for entries that correspond to keywords relating to materials among the input keywords (2803). Information on materials is included in the information 1310 on research plans of research and development themes, for example, the name of research and development theme 1303, the goal 1315, the implementation items 1316 and the milestones 1317. If there is a corresponding entry (2803: YES), the administrative server 126 extracts the name 1303 and the research number 1302 of the research and development theme related to the keywords from the research theme database 108 (2805) and makes a list in descending order of priority.

At this time, the administrative server 126 also extracts the name of researcher 1306, the researcher ID number 402 of the researcher who is working on the research and development theme, and the research period 1304. If a plurality of materials are obtained from the search results, relevant research and development themes are extracted and lists are created for each material. If there are no corresponding entries in the search results (2803: NO), the administrative server 126 can display a message to that effect on the search screen and urge the user to input other search keywords (2804). The names of the materials obtained in the search results are displayed as a plurality of entries in descending order of priority on the search screen (2806).

The person conducting the search can specify a specific material from the group of materials displayed in the previous step to display the name of a research and development theme related to that material on the administrative server 126 (2807, 2808). If there are a plurality of research and development themes for the specified material, the person conducting the search can further specify one research and development theme (2809).

At this time, the administrative server 126 uses the research number 1302 and research period 1304 of the research and development theme to respectively extract information on research reports, patents and external publications related to the research and development theme, and names 1111 and device ID numbers 501 of the devices used from the research report database 110, the internal patent database 109, the external publication database 111 and the device usage database 125 (2810), and display that information on the material research assistance screen 2700 (2811). The administrative server 126 can display the information extracted in Step 2805 from the research theme database 108 as the name 1306 of the researcher that worked on the theme. If there are a plurality of extracted items, the administrative server 126 displays extracted results for each item side-by-side.

The person conducting the search can display details of a specific item among the items on research reports, patents, external publications, devices and researchers associated with the research and development theme displayed in the previous step on the administrative server 126 (2812 to 2814). If there are no corresponding entries, the administrative server 126 uses the identification number associated with each item to extract and display detailed information from databases in the research and development support system.

As illustrated in FIG. 27, if a specific research report is selected, the administrative server 126 uses the identification number 1501 of the report to extract and display detailed information from the research report database 110. If the name of a specific researcher has been specified, the administrative server 126 uses the ID number 402 of the researcher to extract information such as the department of the researcher in the organization, the research and development specialty and the research theme the researcher is currently working on from the plurality of database groups in the system including the research theme database 108 and the researcher information database 127, and then displays that information. If a specific device is selected, the administrative server 126 uses the ID number 501 (or 1202) of the device to extract detailed information on the device from the asset database 116 and the device usage database 125 and display that information.

Similar to the Examples described above, the dedicated database for search results 205 that stores keywords used in searches and the search results can be combined with other database groups in the system to form a database that gives recommendations. The administrative server 126 can use a recommendation model to display new information associated with the input search keywords or the search results as a recommendation (2815 to 2817). FIG. 27 illustrates an example of recommendation information 2706 as information on names of researchers who are knowledgeable about the selected material, the names of experiment devices that should be used with the material for research and development, the names of materials that were searched for by people who searched for the specific material, and academic information such as papers related to the material.

The person conducting the search can obtain peripheral information relating to materials in addition to information obtained from research and development results when the associated information that includes recommendations includes more specific information. As a result, it is possible to simplify obtain specific and useful information on materials without spending extra time, meaning that research and development can be made more efficient.

Through using the research and development support system 106 as described above, it is easier than before to obtain information on materials required to conduct research and development in material fields, and hence research and development can be made more efficient.

Example 7

Example 7 is an example of a case where a research manager or business manager uses the research and development support system 106 to search for return on investment of research and development using the research theme database 108 and the sales database 119 in the system.

Figure 29A:
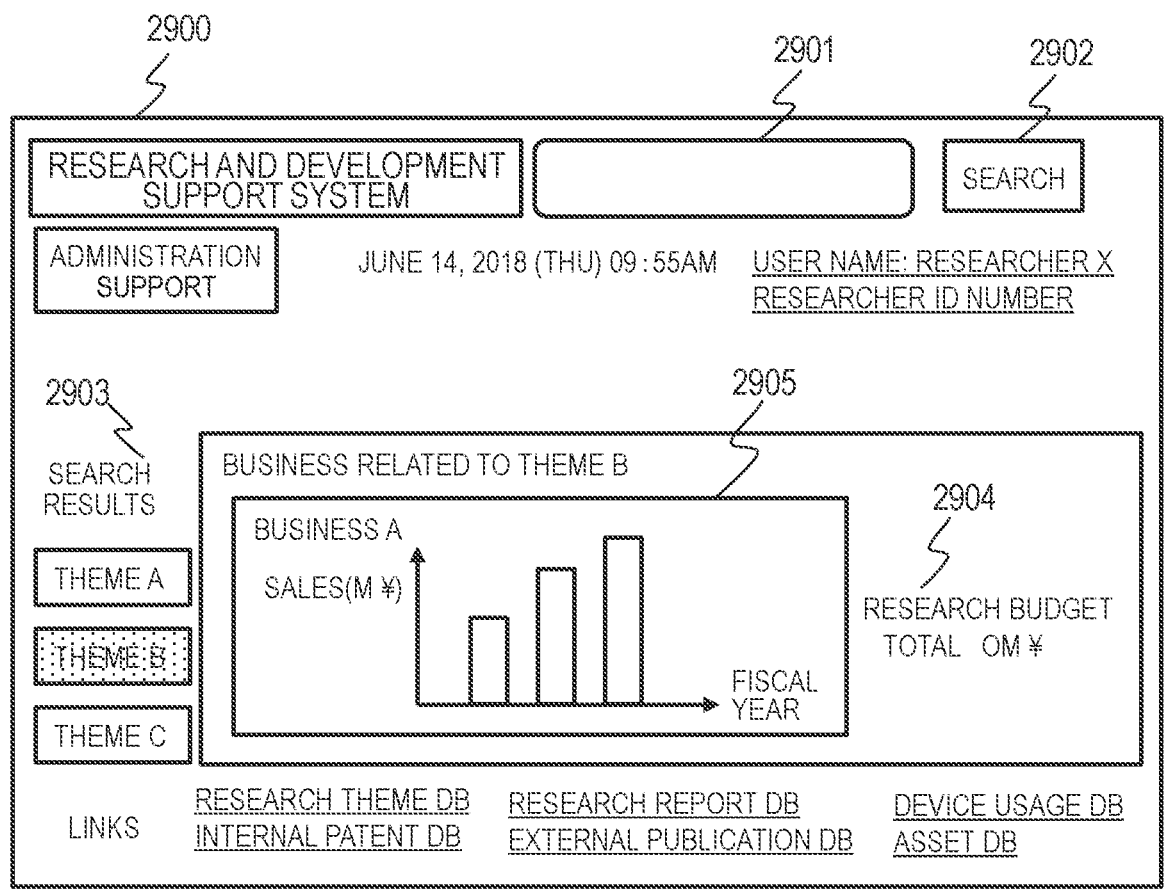
FIG. 29A illustrates a user interface screen that appears when the researcher manager or business manager searches for a specific research and development theme and related sales.

FIG. 29A illustrates a user interface screen that appears when the researcher manager or business manager searches for a specific research and development theme and related sales. This screen is a return-on-investment search screen 2900. The administrative server 126 generates data on the screen such as that illustrated in FIG. 27 and sends the data to the client terminal 124 that is connected to the research and development support system 106. Then, the client terminal 124 can display the received data on the screen. Some of the information displayed on the return-on-investment search screen 2900 illustrated in FIG. 29A may be omitted.

A list 2903 of research and development themes that match or are similar to specific criteria is displayed on the screen 2900. If a specific research and development theme is selected from the list, the return-on-investment search screen 2900 displays total amount 2904 of a research budget for the theme and sales 2905 related to the theme. A reverse search can also be conducted.

Figure 29B:
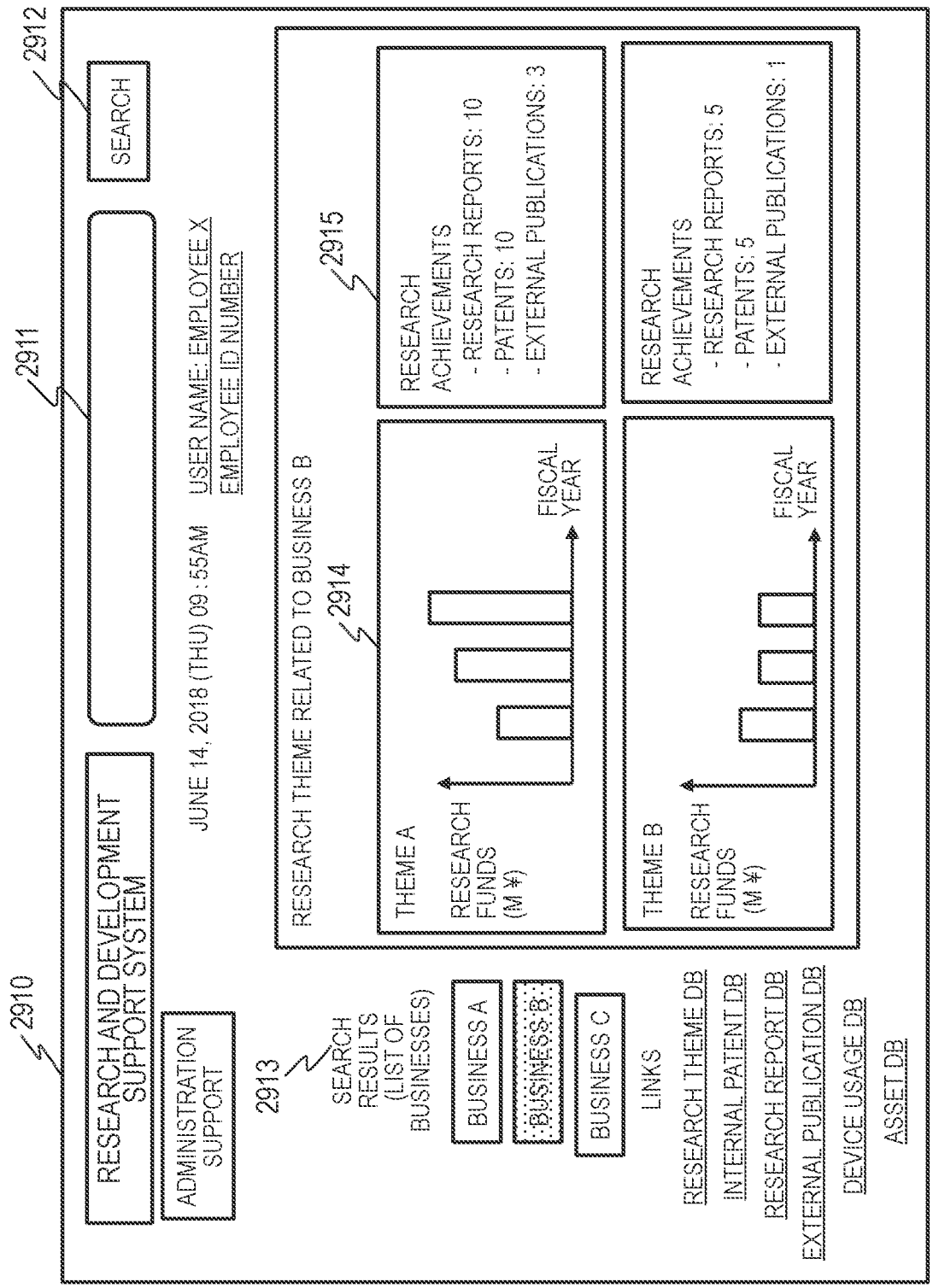
FIG. 29B shows a user interface screen that appears when primarily a business manager or business-related person searches for a specific research and development investment amount for a research and development theme related to business.

FIG. 29B shows a user interface screen that appears when primarily a business manager or business-related person searches for a specific research and development investment amount for a research and development theme related to business. This screen is an investment amount search screen 2910. The investment amount search screen 2910 displays a list 2913 of businesses that match or are similar to specific search criteria. The investment amount search screen 2910 can display an outline of a research capital 2914 and a research results 2915 for a specific research and development theme related to business that is specified from the list. Some of the information displayed on the investment amount search screen 2910 illustrated in FIG. 29B may be omitted.

Data stored in the research theme database 108, which is one of the databases used when conducting the above-described search, has already been described with reference to FIG. 13. FIG. 30 illustrates a table of the data stored in the sales database 119. Sales-related information 3000 includes a name of business or product 3002, a client number 3001 for distinguishing between businesses, a yearly sales amount 3003, the relevant research and development theme name 1303 and research number 1302, the implementation period 3004 for research and development, and research period 3005. Other items may also be added.

Next, a method of acquiring the information displayed on the return-on-investment search screen 2900 illustrated in FIG. 29A is described with reference to the information processing flow illustrated in FIG. 31. The person conducting the search inputs search keywords to the search term entry field 2901 illustrated in FIG. 29A on the client terminal 124. A plurality of search keywords can be input, but a keyword corresponding to all or part of the name of the research and development theme must be input. The client number, research number, research period, and name or ID number of researcher may also be input.

The input keywords make up search criteria and are sent from the client terminal 124 to the administrative server 126 and acquired from the administrative server 126. (3102). In the next step, the administrative server 126 searches the research theme database 108 for the names 1303 and research numbers 1302 of research and development themes that match or are similar to the keywords (3103).

If there are research and development themes that match or are similar to the keywords (3103: YES), the administrative server 126 extracts the names 1303 and research numbers 1302 of the research and development themes (3105), makes a list of the themes in descending order of priority and displays the list on the search screen (3106). If there are no corresponding entries (3103: NO), a message to that effect can be displayed and the user can be urged to input other search keywords (3104).

In the next step, the person conducting the search can specify a specific research and development theme from the research and development theme group displayed in the previous step (3107). If a research and development theme has been specified, that is, if specification of a research and development theme has been received from the client terminal 124, the administrative server 126 reads the research number 1302 of the theme from the specification (3108) and searches the sales database 119 for the sales amount 3003 of products or businesses related to the number (3109). If there is a corresponding entry (3109: YES), the administrative server 126 extracts the sales amount 3003 for products or businesses related to the number from the sales database 119 (3111) and displays that amount on the search screen (3112).

If there are no corresponding entries (3109: NO), the administrative server 126 can display a message to that effect (3110). Sales records (sales amounts) can be output in the form of a table, a graph, or another form. The total budget of the research and development theme obtained from the research theme database 108 can also be displayed with the sales records.

Information on the research and development theme, researchers who worked on the theme, and the devices used for the theme can be effectively linked with and displayed with the information stored in the databases in the research and development support system 106 through using the research theme database 108, the device usage database 125 and the asset database 116.

Therefore, when focusing on a specific device, it is possible to easily search for a research and development theme for which a device was used for experiments, and also the names of businesses and the sales of those businesses associated with the research and development theme. It then becomes possible to estimate how much the device has contributed to business and sales and clearly show return on investment of the device for research and development.

Figure 31:
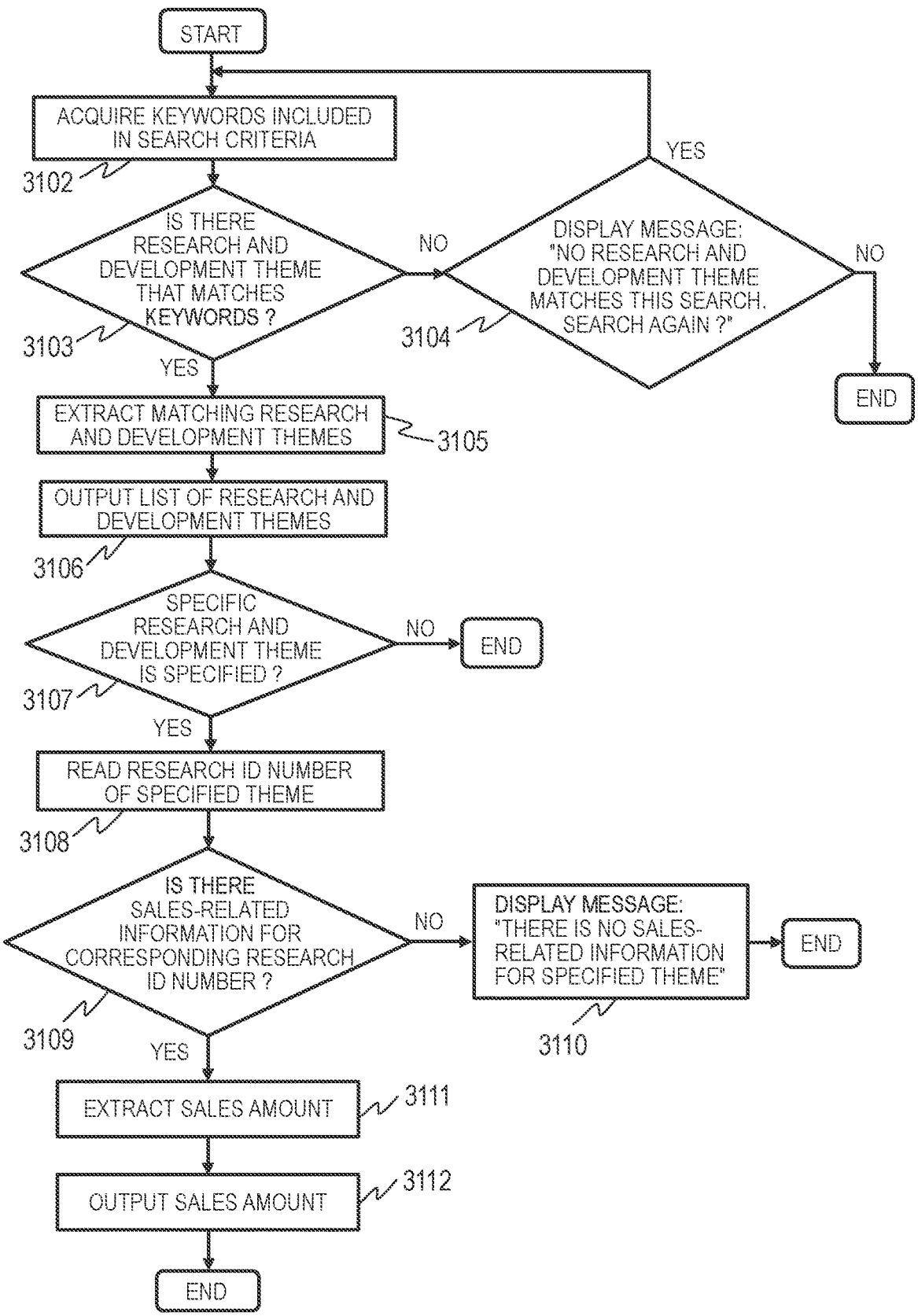
FIG. 31 illustrates an information processing flow for a method of acquiring the information displayed on the return-on-investment search screen illustrated in FIG. 29A.

As illustrated in FIG. 29B, when searching for an amount invested into a research and development theme that is related to a business from that business, it is best to perform information processing such as that illustrated in the information processing flow in FIG. 31 where the research and development theme name 1303 is replaced with a business name or a product name 3002, the research number 1302 is replaced with a client number 3001 and the sales-related information 3000 is replaced with information 1300 on the research and development theme.

Through using the research and development support system 106 as described above, it is easier than before to obtain information representing the relationship between investment and sales relative to research and development, and hence research and development can be made more efficient.

The present invention is not limited to the above-described embodiments but includes various modifications. The above-described embodiments are explained in details for better understanding of The present and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A research and development support system comprising:
   a client terminal;
   one or more databases, coupled to the client terminal, that store a plurality of types of data and information related to research and development performed by a plurality of researchers, and store device-related information which is information related to each of a plurality of devices used for research and development by the researchers, and usage history information which is information of history of the device being used by the researchers;

an administrative system including a processor coupled to the client terminal that accesses the one or more databases to perform information processing, the administrative system generating and outputting information that supports research and development on the basis of the usage history information, the device-related information, and the research and development-related information;

a plurality of user sensor terminals that are respectively worn by each researcher; and a plurality of device sensor terminals that are respectively attached to the plurality of devices, wherein upon a respective user sensor terminal and a respective device sensor terminal being within a predetermined distance, the respective user sensor terminal and the respective device sensor terminal communicate with each other and the user sensor terminal records usage history information including an identifier for the researcher, an identifier for the respective device, and a usage start time and a usage end time, wherein the client terminal acquires the stored usage history information and transmits the usage history information to the one or more databases via the client terminal, wherein the processor of the administrative system is configured to:

acquire a keyword included in input search criteria;

search the one or more databases for a candidate device that matches or is similar to the keywords;

extracts information related to asset management and specifications of the candidate device from the device-related information and includes the information related to asset management and specifications in the information that supports research and development;

extracts information on time of the user using the candidate device from the usage history information and includes the information on time in the information that supports research and development;

extracts the name of the candidate device and the name of the user of the candidate device from the one or more databases and includes the names in the information that supports research and development; and extracts a research theme that the user of the candidate device is currently working on from the research and development-related information and includes the research theme in the information that supports research and development.

2. The research and development support system according to claim 1, wherein the one or more databases store order information related to research and development, and wherein the processor of the administrative system is configured to:

extracts a device usage record including a reservation time and a usage time for the user of the candidate device, and a maintenance record including maintenance time during which the candidate device was not used for experiments, from the usage history information and includes the records in the information that supports research and development.

3. The research and development support system according to claim 1, wherein the administrative system extracts information associated with usage of the candidate device from the one or more databases according to a recommendation model, and includes the information associated with usage of the candidate device in the information that supports research and development.

4. The research and development support system according to claim 1, wherein the processor of the administrative system is configured to:

searches for a candidate research and development theme that matches or is similar to the keywords in the research and development-related information;

extracts information related to a research plan including name of the candidate research and development theme, implementation items, goals, and names of researchers working on the theme from the research and development-related information and includes the information related to a research plan in the information that supports research and development;

extracts the name of the device being used by the researcher for working on the research and development theme from the device-related information and includes the name in the information that supports research and development; and extracts a device usage record including a reservation time and a usage time of the device being used by the researcher for working on the research and development theme from the usage history information and includes the device usage record in the information that supports research and development.

5. The research and development support system according to claim 4, wherein the administrative system extracts information associated with the research plan from the one or more databases according to a recommendation model, and includes the information associated with the research plan in the information that supports research and development.

6. The research and development support system according to claim 1, wherein the processor of the administrative system is configured to:

extracts information on a research plan including names, implementation items, and goals of research and development themes that the specified researcher oversees from the research and development-related information and includes the information on the research plan in the information that supports research and development;

receives specification of one research and development theme selected from the research and development themes that the specified researcher oversees;

extracts the name of the device that is used by the researcher for the specified research and development theme from the device-related information and includes the name in the information that supports research and development;

extracts a record of use of the device by the researcher for the specified research and development theme from the usage history information and includes the record of use in the information that supports research and development; and extracts a record of experiments by the specified researcher from the research and development-related information and includes the record in the information that supports research and development.

7. The research and development support system according to claim 6, wherein the administrative system extracts information associated with research and development of the specified researcher from the one or more databases according to a recommendation model, and includes the information associated with research and development of the specified researcher in the information that supports research and development.

8. The research and development support system according to claim 6, wherein the record on experiments by the specified researcher includes at least one of:
- physical experiment notes or electronic experiment notes written by the specified researcher;
- electronic experiment data output from a device that the specified researcher used for experiments;
- figures created with the experiment data;
- ideas of the specified researcher for research and development; and
- notes detailing a thought process relating to experiment results.

9. The research and development support system according to claim 1,
- wherein the processor of the administrative system is configured to:
- searches the research and development-related information for candidate research and development themes that match or are similar to the keywords;
- extracts information on the name, an implementation period, and deliverables of the candidate research and development theme from the research and development-related information and includes the name, implementation period and deliverables in the information that supports research and development;
- extracts names of the researchers working on the candidate research and development theme and names of the devices used for the candidate research and development theme from the one or more databases and includes the names in the information that supports research and development;
- extracts usage records for the devices used for the candidate research and development themes from the usage history information and includes the usage records in the information that supports research and development;
- extracts information on asset management and specifications of the devices used for the candidate research and development theme from the device-related information and includes the information on asset management and specifications in the information that supports research and development; and
- extracts research information including department and specialty of the researcher and working on the candidate research and development theme and the research theme the researcher is currently working on from the research and development-related information and includes the research information in the information that supports research and development.

10. The research and development support system according to claim 9, wherein the administrative system extracts information associated with materials that match or are similar to the keywords from the one or more databases according to a recommendation model, and includes the information associated with materials in the information that supports research and development.

11. The research and development support system according to claim 1,
- wherein the one or more databases stores sales information as information on sales related to businesses or products, and
- wherein the administrative system:
  - acquires keywords included in input search criteria;
  - searches the research and development-related information for candidate research and development themes that matches or are similar to the keywords;
  - extracts the names of the candidate research and development themes and the names of businesses that provide research funding for the candidate research and development themes or the names of businesses or products associated with the candidate research and development themes from the research and development-related information and includes those names in the information that supports research and development; and
  - extracts information on sales related to the businesses or products from the sales information and includes the information on sales in the information that supports research and development.

12. The research and development support system according to claim 1,
- wherein the one or more databases stores sales information as information on sales related to businesses or products, and
- wherein the administrative system:
  - acquires keywords included in input search criteria;
  - extracts the names of businesses or products that match or are similar to the keywords and information on sales related to the businesses or products from the sales information and includes the names and information in the information that supports research and development; and
  - extracts names of research and development themes that receive research funding from the businesses or products from the research and development-related information and includes those names in the information that supports research and development.

* * * * *